United States Patent
Moon et al.

(10) Patent No.: US 11,442,992 B1
(45) Date of Patent: Sep. 13, 2022

(54) CONVERSATIONAL REASONING WITH KNOWLEDGE GRAPH PATHS FOR ASSISTANT SYSTEMS

(71) Applicant: Meta Platforms Technologies, LLC, Menlo Park, CA (US)

(72) Inventors: Seungwhan Moon, Seattle, WA (US); Pararth Paresh Shah, Sunnyvale, CA (US); Anuj Kumar, Santa Clara, CA (US); Rajen Subba, San Carlos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 419 days.

(21) Appl. No.: 16/557,055

(22) Filed: Aug. 30, 2019

Related U.S. Application Data

(60) Provisional application No. 62/868,631, filed on Jun. 28, 2019.

(51) Int. Cl.
*G06F 16/9032* (2019.01)
*G06N 20/00* (2019.01)
(Continued)

(52) U.S. Cl.
CPC .... *G06F 16/90332* (2019.01); *G06F 16/9024* (2019.01); *G06N 3/049* (2013.01); *G06N 20/00* (2019.01); *G06Q 50/01* (2013.01)

(58) Field of Classification Search
None
See application file for complete search history.

(56) References Cited

U.S. PATENT DOCUMENTS 7,124,123 B1  10/2006  Roskind
7,158,678 B2  1/2007  Nagel
(Continued)

FOREIGN PATENT DOCUMENTS

AU   2017203668   1/2018
EP     2530870   12/2012
(Continued)

OTHER PUBLICATIONS

U.S. Appl. No. 14/593,723, filed Jan. 9, 2015, Colin Patrick Treseler.
(Continued)

*Primary Examiner* — Antim G Shah
(74) *Attorney, Agent, or Firm* — Baker Botts L.L.P.

(57) ABSTRACT

In one embodiment, a method includes receiving a query from a user from a client system associated with the user, accessing a knowledge graph comprising a plurality of nodes and edges connecting the nodes, wherein each node corresponds to an entity and each edge corresponds to a relationship between the entities corresponding to the connected nodes, determining one or more initial entities associated with the query based on the query, selecting one or more candidate nodes by a conversational reasoning model from the knowledge graph corresponding to one or more candidate entities, respectively, wherein each candidate node is selected based on the nodes corresponding to the initial entities, dialog states associated with the query, and a context associated with the query, generating a response based on the initial entities and the candidate entities, and sending instructions for presenting the response to the client system in response to the query.

20 Claims, 11 Drawing Sheets

(51) Int. Cl.
*G06Q 50/00* (2012.01)
*G06N 3/04* (2006.01)
*G06F 16/901* (2019.01)

(56) References Cited

U.S. PATENT DOCUMENTS

| | | | |
|---|---|---|---|
| 7,397,912 | B2 | 7/2008 | Aasman |
| 8,027,451 | B2 | 9/2011 | Arendsen |
| 8,560,564 | B1 | 10/2013 | Hoelzle |
| 8,677,377 | B2 | 3/2014 | Cheyer |
| 8,935,192 | B1 | 1/2015 | Ventilla |
| 8,983,383 | B1 | 3/2015 | Haskin |
| 9,154,739 | B1 | 10/2015 | Nicolaou |
| 9,299,059 | B1 | 3/2016 | Marra |
| 9,304,736 | B1 | 4/2016 | Whiteley |
| 9,338,242 | B1 | 5/2016 | Suchland |
| 9,338,493 | B2 | 5/2016 | Van Os |
| 9,390,724 | B2 | 7/2016 | List |
| 9,418,658 | B1 | 8/2016 | David |
| 9,472,206 | B2 | 10/2016 | Ady |
| 9,479,931 | B2 | 10/2016 | Ortiz |
| 9,576,574 | B2 | 2/2017 | van Os |
| 9,659,577 | B1 | 5/2017 | Langhammer |
| 9,747,895 | B1 | 8/2017 | Jansche |
| 9,792,281 | B2 | 10/2017 | Sarikaya |
| 9,858,925 | B2 | 1/2018 | Gruber |
| 9,865,260 | B1 | 1/2018 | Vuskovic |
| 9,875,233 | B1 | 1/2018 | Tomkins |
| 9,875,741 | B2 | 1/2018 | Gelfenbeyn |
| 9,886,953 | B2 | 2/2018 | Lemay |
| 9,990,591 | B2 | 6/2018 | Gelfenbeyn |
| 10,042,032 | B2 | 8/2018 | Scott |
| 10,134,395 | B2 | 11/2018 | Typrin |
| 10,199,051 | B2 | 2/2019 | Binder |
| 10,241,752 | B2 | 3/2019 | Lemay |
| 10,276,170 | B2 | 4/2019 | Gruber |
| 2008/0240379 | A1 | 10/2008 | Maislos |
| 2012/0246191 | A1 | 9/2012 | Xiong |
| 2012/0265528 | A1 | 10/2012 | Gruber |
| 2013/0268839 | A1 | 10/2013 | Lefebvre |
| 2013/0275138 | A1 | 10/2013 | Gruber |
| 2013/0275164 | A1 | 10/2013 | Gruber |
| 2014/0164506 | A1 | 6/2014 | Tesch |
| 2015/0179168 | A1 | 6/2015 | Hakkani-Tur |
| 2015/0363476 | A1* | 12/2015 | Li ................... G06F 16/258 707/736 |
| 2016/0225370 | A1 | 8/2016 | Kannan |
| 2016/0255082 | A1 | 9/2016 | Rathod |
| 2016/0328096 | A1 | 11/2016 | Tran |
| 2016/0378849 | A1 | 12/2016 | Myslinski |
| 2016/0378861 | A1 | 12/2016 | Eledath |
| 2017/0091168 | A1 | 3/2017 | Bellegarda |
| 2017/0132019 | A1 | 5/2017 | Karashchuk |
| 2017/0353469 | A1 | 12/2017 | Selekman |
| 2017/0359707 | A1 | 12/2017 | Diaconu |
| 2018/0018562 | A1 | 1/2018 | Jung |
| 2018/0018987 | A1 | 1/2018 | Zass |
| 2018/0096071 | A1 | 4/2018 | Green |
| 2018/0096072 | A1 | 4/2018 | He |
| 2018/0107917 | A1 | 4/2018 | Hewavitharana |
| 2018/0189629 | A1 | 7/2018 | Yatziv |
| 2019/0042988 | A1* | 2/2019 | Brown ................. G06N 5/022 |
| 2019/0065627 | A1* | 2/2019 | De Mel ................. G06F 40/295 |
| 2019/0080698 | A1 | 3/2019 | Miller |
| 2020/0042642 | A1* | 2/2020 | Bakis ..................... G06F 40/35 |

FOREIGN PATENT DOCUMENTS

| | | |
|---|---|---|
| EP | 3122001 | 1/2017 |
| WO | WO 2012/116241 | 8/2012 |
| WO | WO 2016/195739 | 12/2016 |
| WO | WO 2017/053208 | 3/2017 |
| WO | WO 2017/116488 | 7/2017 |

OTHER PUBLICATIONS

U.S. Appl. No. 15/808,638, filed Nov. 9, 2017, Ryan Brownhill.
U.S. Appl. No. 15/953,957, filed Apr. 16, 2018, Kemal El Moujahid.
U.S. Appl. No. 15/966,455, filed Apr. 30, 2018, Scott Martin.
U.S. Appl. No. 15/967,193, filed Apr. 30, 2018, Davide Testuggine.
U.S. Appl. No. 15/967,239, filed Apr. 30, 2018, Vivek Natarajan.
U.S. Appl. No. 15/967,279, filed Apr. 30, 2018, Fuchun Peng.
U.S. Appl. No. 15/967,290, filed Apr. 30, 2018, Fuchun Peng.
U.S. Appl. No. 15/967,342, filed Apr. 30, 2018, Vivek Natarajan.
U.S. Appl. No. 16/011,062, filed Jun. 18, 2018, Jinsong Yu.
U.S. Appl. No. 16/025,317, filed Jul. 2, 2018, Sonal Gupta.
U.S. Appl. No. 16/036,827, filed Jul. 16, 2018, Emmanouil Koukoumidis.
U.S. Appl. No. 16/038,120, filed Jul. 17, 2018, Jason Schissel.
U.S. Appl. No. 16/048,049, filed Jul. 27, 2018, Markku Salkola.
U.S. Appl. No. 16/048,072, filed Jul. 27, 2018, Markku Salkola.
U.S. Appl. No. 16/048,101, filed Jul. 27, 2018, Markku Salkola.
U.S. Appl. No. 16/053,600, filed Aug. 2, 2018, Vivek Natarajan.
U.S. Appl. No. 16/057,414, filed Aug. 7, 2018, Jeremy Gillmor Kahn.
U.S. Appl. No. 16/103,775, filed Aug. 14, 2018, Zheng Zhou.
U.S. Appl. No. 16/107,601, filed Aug. 21, 2018, Rajesh Krishna Shenoy.
U.S. Appl. No. 16/107,847, filed Aug. 21, 2018, Rajesh Krishna Shenoy.
U.S. Appl. No. 16/118,169, filed Aug. 30, 2018, Baiyang Liu.
U.S. Appl. No. 16/121,393, filed Sep. 4, 2018, Zheng Zhou.
U.S. Appl. No. 16/127,173, filed Sep. 10, 2018, Zheng Zhou.
U.S. Appl. No. 16/129,638, filed Sep. 12, 2018, Vivek Natarajan.
U.S. Appl. No. 16/135,752, filed Sep. 19, 2018, Xiaohu Liu.
U.S. Appl. No. 16/150,069, filed Oct. 2, 2018, Jiedan Zhu.
U.S. Appl. No. 16/150,184, filed Oct. 2, 2018, Francislav P. Penov.
U.S. Appl. No. 16/151,040, filed Oct. 3, 2018, Brian Nelson.
U.S. Appl. No. 16/168,536, filed Oct. 23, 2018, Benoit F. Dumoulin.
U.S. Appl. No. 16/176,081, filed Oct. 31, 2018, Anusha Balakrishnan.
U.S. Appl. No. 16/176,312, filed Oct. 31, 2018, Emmanouil Koukoumidis.
U.S. Appl. No. 16/182,542, filed Nov. 6, 2018, Michael Robert Hanson.
U.S. Appl. No. 16/183,650, filed Nov. 7, 2018, Xiaohu Liu.
U.S. Appl. No. 16/192,538, filed Nov. 15, 2018, Emmanouil Koukoumidis.
U.S. Appl. No. 16/222,923, filed Dec. 17, 2018, Jason Schissel.
U.S. Appl. No. 16/222,957, filed Dec. 17, 2018, Emmanouil Koukoumidis.
U.S. Appl. No. 16/229,828, filed Dec. 21, 2018, Xiaohu Liu.
U.S. Appl. No. 16/247,439, filed Jan. 14, 2019, Xiaohu Liu.
U.S. Appl. No. 16/264,173, filed Jan. 31, 2019, Ashwini Challa.
U.S. Appl. No. 16/376,832, filed Apr. 5, 2019, Honglei Liu.
U.S. Appl. No. 16/389,769, filed Apr. 19, 2019, Honglei Liu.
U.S. Appl. No. 16/389,769, filed Apr. 19, 2019, Paul Anthony Crook.
U.S. Appl. No. 16/389,738, filed Apr. 19, 2019, Fuchun Peng.
U.S. Appl. No. 16/389,728, filed Apr. 19, 2019, William Crosby Presant.
U.S. Appl. No. 16/388,130, filed Apr. 18, 2019, Xiaohu Liu.
U.S. Appl. No. 16/389,708, filed Apr. 19, 2019, William Crosby Presant.
U.S. Appl. No. 16/434,010, filed Jun. 6, 2019, Sergiu Dogaru.
U.S. Appl. No. 16/552,559, filed Aug. 27, 2019, Seungwhan Moon.
U.S. Appl. No. 62/660,876, filed Apr. 20, 2018, Anuj Kumar.
U.S. Appl. No. 62/675,090, filed May 22, 2018, Michael Robert Hanson.
U.S. Appl. No. 62/747,628, filed Oct. 18, 2018, Honglei Liu.
U.S. Appl. No. 62/749,608, filed Oct. 23, 2018, Ashwini Challa.
U.S. Appl. No. 62/750,746, filed Oct. 25, 2018, Honglei Liu.
Mari Ostendorf, et al.: Human Language Technology: Opportunities and Challenges, IEEE International Conference on Acoustics, Speech, and Signal Processing, Mar. 23, 2005.
Adam Poliak, et al.: Efficient, Compositional, Order-Sensitive n-gram Embeddings, Proceedings of the 15th Conference of the European

(56) References Cited

OTHER PUBLICATIONS

Chapter of the Association for Computational Linguistics: vol. 2, Short Papers, pp. 503-508, Valencia, Spain, Apr. 3-7, 2017.
Chris Dyer, et al.: Recurrent Neural Network Grammars, Proceedings of NAACL-HLT 2016, pp. 199-209, San Diego, California, Jun. 12-17, 2016.
Overview of Language Technology, https://www.dfki.de/lt/lt-general.php, Feb. 15, 2018.
Jim Glass: A Brief Introduction to Automatic Speech Recognition, http://www.cs.columbia.edu/~mcollins/6864/slides/asr.pdf, Feb. 15, 2018.
Speech Synthesis, https://en.wikipedia.org/wiki/Speech_synthesis, Feb. 15, 2018.
Natural-language Understanding, https://en.wikipedia.org/wiki/Natural-language_understanding, Feb. 15, 2018.
Conversational AI and the Road Ahead, https://techcrunch.com/2017/02/25/conversational-ai-and-the-road-ahead/, Feb. 15, 2018.
What is Conversational AI? https://blog.salemove.com/what-is-conversational-ai/, Feb. 15, 2018.
Question Answering, https://en.wikipedia.org/wiki/Question_answering, Feb. 15, 2018.
Dialog Manager, https://en.wikipedia.org/wiki/Dialog_manager, Feb. 15, 2018.
Dialog Management, https://tutorials.botsfloor.com/dialog-management-799c20a39aad, Feb. 15, 2018.
Steeve Huang, Word2Vec and FastText Word Embedding with Gensim, https://towardsdatascience.com/word-embedding-with-word2vec-and-fasttext-a209c1de12c, Mar. 13, 2018.
Ashwini Challa, et al.: Generate, Filter, and Rank: Grammaticality Classification for Production-Ready NLG Systems, arXiv:1904.03279, Apr. 9, 2019.
Honglei Liu, et al.: Explore-Exploit: A Framework for Interactive and Online Learning, arXiv: 1812.00116, Dec. 1, 2018.
Turniški, Filip, et al. "Analysis of 3G and 4G download throughput in pedestrian zones." 2016 International Symposium ELMAR. IEEE, Sep. 12, 2016.
Dubin, Ran, et al. "Adaptation Logic for HTTP Dynamic Adaptive Streaming using Geo-Predictive Crowdsourcing," arXiv preprint arXiv:1602.02030 (Feb. 5, 2016).
Chat Extensions, https://developers.facebook.com/docs/messenger-platform/guides/chat-extensions, Apr. 18, 2017.
Google Allo Makes Conversations Eeasier, Productive, and more Expressive, https://www.trickyways.com/2016/05/google-allo-makes-conversations-ecasier-productive-expressive/, May 19, 2016.
Agrawal, Aishwarya, et al. "VQA: Visual Question Answering." *International Journal of Computer Vision* 1.123 (Oct. 27, 2016): 4-31.
Bast, Hannah, et al. "Easy access to the freebase dataset." Proceedings of the 23rd International Conference on World Wide Web. ACM, Apr. 7-11, 2014.
Bauer, Lisa, Yicheng Wang, and Mohit Bansal. "Commonsense for generative multi-hop question answering tasks." arXiv preprint arXiv:1809.06309 (2018).
Bordes, Antoine, et al. "Large-scale simple question answering with memory networks" arXiv preprint arXiv:1506.02075 (Jun. 5, 2015).
Bordes, Antoine, et al. "Translating embeddings for modeling multi-relational data." Advances in neural information processing systems. Dec. 5, 2013.
Bordes, Antoine, Y-Lan Boureau, and Jason Weston. "Learning end-to-end goal-oriented dialog." arXiv preprint arXiv:1605.07683 (2016).
Choi, Eunsol, et al. "Quac: Question answering in context." arXiv preprint arXiv:1808.07036 (Aug. 28, 2018).
Clark, Peter, et al. "Think you have solved question answering? try arc, the ai2 reasoning challenge." arXiv preprint arXiv:1803.05457 (Mar. 14, 2018).
Conneau, Alexis, et al. "Supervised Learning of Universal Sentence Representations from Natural Language Inference Data." (Jul. 8, 2018).
Dalton, Jeffrey, Victor Ajayi, and Richard Main. "Vote Goat: Conversational Movie Recommendation." The 41st International ACM SIGIR Conference on Research & Development in Information Retrieval. ACM, May 15, 2018.
De Vries, Harm, et al. "Talk the walk: Navigating new york city through grounded dialogue." arXiv preprint arXiv:1807.03367 (Dec. 23, 2018).
Dubey, Mohnish, et al. "Earl: Joint entity and relation linking for question answering over knowledge graphs." International Semantic Web Conference. Springer, Cham, Jun. 25, 2018.
Duchi, John, Elad Hazan, and Yoram Singer. "Adaptive subgradient methods for online learning and stochastic optimization." Journal of Machine Learning Research Jul. 12, 2011: 2121-2159.
Hudson, Drew A., and Christopher D. Manning. "Gqa: A new dataset for real-world visual reasoning and compositional question answering." Proceedings of the IEEE Conference on Computer Vision and Pattern Recognition. May 10, 2019.
Jiang, Lu, et al. "Memexqa: Visual memex question answering." arXiv preprint arXiv:1708.01336 (Aug. 4, 2017).
Jung, Hyunwoo, et al. "Learning What to Remember: Long-term Episodic Memory Networks for Learning from Streaming Data." arXiv preprint arXiv:1812.04227 (Dec. 11, 2018).
Kottur, Satwik, et al. "Visual coreference resolution in visual dialog using neural module networks." Proceedings of the European Conference on Computer Vision (ECCV). Sep. 8-14, 2018.
Kumar, Ankit, et al. "Ask me anything: Dynamic memory networks for natural language processing." International conference on machine learning. Jan. 6, 2016.
Li, Jiwei, et al. "A persona-based neural conversation model." arXiv preprint arXiv:1603.06155 (Jun. 8, 2016).
Pennington, Jeffrey, Richard Socher, and Christopher Manning. "Glove: Global vectors for word representation." Proceedings of the 2014 conference on empirical methods in natural language processing (EMNLP). Oct. 25-29, 2014.
Rajpurkar, Pranav, et al., "Squad: 100,000+ questions for machine comprehension of text." arXiv preprint arXiv:1606.05250 (Oct. 11, 2016).
Rajpurkar, Pranav, Robin Jia, and Percy Liang. "Know What You Don't Know: Unanswerable Questions for SQuAD." arXiv preprint arXiv:1806.03822 (Jun. 11, 2018).
Reddy, Siva, Danqi Chen, and Christopher D. Manning. "Coqa: A conversational question answering challenge." Transactions of the Association for Computational Linguistics 7 (May 29, 2019): 249-266.
Seo, Minjoon, et al., "Bidirectional attention flow for machine comprehension." arXiv preprint arXiv:1611.01603 (2016).
Sukhbaatar, Sainbayar, Jason Weston, and Rob Fergus. "End-to-end memory networks." Advances in neural information processing systems. Nov. 24, 2015.
Tran, Ke, Arianna Bisazza, and Christof Monz. "Recurrent memory networks for language modeling." arXiv preprint arXiv:1601.01272 (Apr. 22, 2016).
Wang, Peng, et al. "Fvqa: Fact-based visual question answering." IEEE transactions on pattern analysis and machine intelligence 40.10 (2018): 2413-2427.
Welbl, Johannes, Pontus Stenetorp, and Sebastian Riedel. "Constructing datasets for multi-hop reading comprehension across documents." Transactions of the Association for Computational Linguistics 6 (Jun. 11, 2018): 287-302.
Salem, Yasser, Jun Hong, and Weiru Liu. "History-guided conversational recommendation." Proceedings of the 23rd International Conference on World Wide Web. ACM, Apr. 7-11, 2014.
Sun, Yueming, and Yi Zhang. "Conversational recommender system." The 41st International ACM SIGIR Conference on Research & Development in Information Retrieval. ACM, Jul. 8-12, 2018.
Wei, Wei, et al. "Airdialogue: An environment for goal-oriented dialogue research." Proceedings of the 2018 Conference on Empirical Methods in Natural Language Processing. Nov. 4, 2018.
Weston, Jason, Sumit Chopra, and Antoine Bordes. "Memory networks." arXiv preprint arXiv:1410.3916 (2014).

(56) References Cited

OTHER PUBLICATIONS

Williams, Jason D., Kavosh Asadi, and Geoffrey Zweig. "Hybrid code networks: practical and efficient end-to-end dialog control with supervised and reinforcement learning." arXiv preprint arXiv:1702.03274 (Apr. 24, 2017).
Wu, Qi, et al. "Image Captioning and Visual Question Answering Based on Attributes and External Knowledge." arXiv preprint arXiv:1603.02814 (Dec. 16, 2016).
Xu, Kun, et al. "Question answering on freebase via relation extraction and textual evidence." arXiv preprint arXiv:1603.00957 (Jun. 9, 2016).
Yang, Zhilin, et al. "Hotpotqa: A dataset for diverse, explainable multi-hop question answering." arXiv preprint arXiv:1809.09600 (Sep. 25, 2018).
Yin, Wenpeng, et al. "Simple question answering by attentive convolutional neural network." arXiv preprint arXiv:1606.03391 (Oct. 11, 2016).
Zhang, Saizheng, et al. "Personalizing Dialogue Agents: I have a dog, do you have pets too?." arXiv preprint arXiv:1801.07243 (Sep. 25, 2018).
Carlson, Andrew, et al. "Toward an architecture for never-ending language learning." *Twenty-Fourth AAAI Conference on Artificial Intelligence.* Jul. 5, 2010.
Chen, Chun-Yen, et al. "Gunrock: Building A Human-Like Social Bot by Leveraging Large Scale Real User Data." (2018).
Chen, Yun-Nung, William Yang Wang, and Alexander Rudnicky. "Jointly modeling inter-slot relations by random walk on knowledge graphs for unsupervised spoken language understanding." *Proceedings of the 2015 Conference of the North American Chapter of the Association for Computational Linguistics: Human Language Technologies.* May 31-Jun. 5, 2015.
Dettmers, Tim, et al. "Convolutional 2d knowledge graph embeddings." *Thirty-Second AAAI Conference on Artificial Intelligence.* Apr. 25, 2018.
Ganin, Yaroslav, et al. "Domain-adversarial training of neural networks." *The Journal of Machine Learning Research* 17.1 (Jan. 1, 2016): 2096-2030.
Ghazvininejad, Madan, et al. "A knowledge-grounded neural conversation model." *Thirty-Second AAAI Conference on Artificial Intelligence.* Apr. 27, 2018.
He, He, et al. "Learning symmetric collaborative dialogue agents with dynamic knowledge graph embeddings." *arXiv preprint atXiv:1704.07130* (Apr. 24, 2017).
Henderson, Matthew, Blaise Thomson, and Jason D. Williams. "The second dialog state tracking challenge." *Proceedings of the 15th Annual Meeting of the Special Interest Group on Discourse and Dialogue (SIGDIAL).* Jun. 18-20, 2014.
Kartsaklis, Dimitri, Mohammad Taker Pilehvar, and Nigel Collier. "Mapping text to knowledge graph entities using multi-sense lstms." arXiv preprint arXiv:1808.07724 (Aug. 23, 2018).
Lao, Ni, Tom Mitchell, and William W. Cohen. "Random walk inference and learning in a large scale knowledge base." Proceedings of the Conference on Empirical Methods in Natural Language Processing, Association for Computational Linguistics, Jul. 27, 2011.
Long, Yinong, et al. "A knowledge enhanced generative conversational service agent." DSTC6 Workshop. Dec. 2017.
Miller, Alexander H., et al. "Parlai: A dialog research software platform." arXiv preprint arXiv:1705.06476 (May 18, 2017).
Moon, Seungwhan, and Jaime G. Carbonell. "Completely Heterogeneous Transfer Learning with Attention—What and What Not to Transfer." IJCAI. Aug. 19, 2017.
Moon, Seungwhan, Suyoun Kim, and Haohan Wang. "Multimodal transfer deep learning with applications in audio-visual recognition." arXiv preprint arXiv:1412.3121 (Dec. 9, 2014).
Moon, Seungwhan, Leonardo Neves, and Vitor Carvalho. "Multimodal named entity recognition for short social media posts." arXiv preprint arXiv:1802.07862 (Feb. 22, 2018).
Moon, Seungwhan, Leonardo Neves, and Vitor Carvalho. "Zeroshot Multimodal Named Entity Disambiguation for Noisy Social Media Posts." Proceedings of the 56th Annual Meeting of the Association for Computational Linguistics (vol. 1: Long Papers). Jul. 15-20, 2018.
Nickel, Maximilian, Lorenzo Rosasco, and Tomaso Poggio. "Holographic embeddings of knowledge graphs." Thirtieth Aaai conference on artificial intelligence. Mar. 2, 2016.
Parthasarathi, Prasanna, and Joelle Pineau. "Extending neural generative conversational model using external knowledge sources." arXiv preprint arXiv:1809.05524 (Sep. 14, 2018).
Salem, Yasser, Jun Hong, and Weiru Liu. "History-guided conversational recommendation." Proceedings of the 23rd International Conference on World Wide Web. ACM, Apr. 7, 2014.
Shah, Pararth, et al. "Bootstrapping a neural conversational agent with dialogue self-play, crowdsourcing and on-line reinforcement learning." Proceedings of the 2018 Conference of the North American Chapter of the Association for Computational Linguistics: Human Language Technologies, vol. 3 (Industry Papers). Jun. 1-6, 2018.
Sutskever, Ilya, Oriol Vinyals, and Quoc V. Le. "Sequence to sequence learning with neural networks." Advances in neural information processing systems. Sep. 10, 2014.
Wang, Zhen, et al. "Knowledge graph embedding by translating on hyperplanes." Twenty-Eighth AAAI conference on artificial intelligence. Jun. 21, 2014.
Yang, Zichao, et al. "Hierarchical attention networks for document classification." Proceedings of the 2016 conference of the North American chapter of the association for computational linguistics: human language technologies. Jun. 12-17, 2016.
Young, Tom, et al. "Augmenting end-to-end dialogue systems with commonsense knowledge." Thirty-Second AAAI Conference on Artificial Intelligence. Apr. 26, 2018.
Zhang, Saizheng, et al. "Personalizing Dialogue Agents: I have a dog, do you have pets too?." arXiv preprint arXiv:1801.07243 (Jan. 22, 2018).
European search report received from the European Patent Office for European Patent Application No. 18201683.2-1222, dated Feb. 4, 2019.
European search report received from the European Patent Office for European Patent Application No. 18201685.7-1222, dated Feb. 4, 2019.
European search report received from the European Patent Office for European Patent Application No. 18201805.1-1222, dated Feb. 4, 2019.
European search report received from the European Patent Office for European Patent Application No. 18201808.5-1222, dated Feb. 4, 2019.
European search report received from the European Patent Office for European Patent Application No. 18201820.0-1222, dated Feb. 5, 2019.
European search report received from the European Patent Office for European Patent Application No. 18201826.7-1222, dated Feb. 4, 2019.
European search report received from the European Patent Office for European Patent Application No. 18203627.7-1222, dated Feb. 5, 2019.
European search report received from the European Patent Office for European Patent Application No. 18203675.6-1222, dated Feb. 5, 2019.
European search report received from the European Patent Office for European Patent Application No. 19155094.6-1218, dated Mar. 19, 2019.

* cited by examiner

S: Movie, T: Sports

S: Movie, T: Book

CONVERSATIONAL REASONING WITH KNOWLEDGE GRAPH PATHS FOR ASSISTANT SYSTEMS

PRIORITY

This application claims the benefit, under 35 U.S.C. § 119(e), of U.S. Provisional Patent Application No. 62/868,631, filed 28 Jun. 2019, which is incorporated herein by reference.

TECHNICAL FIELD

This disclosure generally relates to databases and file management within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, motion, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with it with multi-modal user input (such as voice, text, image, video, motion) in stateful and multi-turn conversations to get assistance. The assistant system may create and store a user profile comprising both personal and contextual information associated with the user. In particular embodiments, the assistant system may analyze the user input using natural-language understanding. The analysis may be based on the user profile for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation. Through the interaction with the user, the assistant system may use dialog management techniques to manage and forward the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute tasks that are relevant to user interests and preferences based on the user profile without a user input. In particular embodiments, the assistant system may check privacy settings to ensure that accessing a user's profile or other user information and executing different tasks are permitted subject to the user's privacy settings.

In particular embodiments, the assistant system may use a conversational reasoning model to generate responses to a user in a dialog session. The conversational reasoning model may strategically traverse through a large-scale common-fact knowledge graph (KG) to introduce engaging and contextually diverse entities and attributes. The conversational reasoning model is learned based on a new open-ended Dialog↔KG parallel corpus called OpenDialKG, where each utterance from 15K human-to-human roleplaying dialogs is manually annotated with ground-truth reference to corresponding entities and paths from a large-scale KG with over one million facts. The conversational reasoning model, referred as the DialKG Walker model, may learn the symbolic transitions of dialog contexts as structured traversals over KG and predict natural entities to introduce given previous dialog contexts via a novel domain-agnostic, attention-based graph path decoder. Automatic and human evaluations show that the model may retrieve more natural and human-like responses than the state-of-the-art baselines or rule-based models, in both in-domain and cross-domain tasks. The model may also generate a KG walk path for each entity retrieved, providing a natural way to explain conversational reasoning. Although this disclosure describes particular conversational reasoning via a particular system in a particular manner, this disclosure contemplates any suitable conversational reasoning via any suitable system in any suitable manner.

In particular embodiments, the assistant system may receive, from a client system associated with a user, a query from the user. The assistant system may then access a knowledge graph comprising a plurality of nodes and a plurality of edges connecting the nodes. Each node may correspond to an entity and each edge may correspond to a relationship between the entities corresponding to the connected nodes. In particular embodiments, the assistant system may determine, based on the query, one or more initial entities associated with the query. The assistant system may then select, by a conversational reasoning model, one or more candidate nodes from the knowledge graph corresponding to one or more candidate entities, respectively. Each candidate node may be selected based on the nodes corresponding to the initial entities, one or more dialog states associated with the query, and a context associated with the query. In particular embodiments, the assistant system may generate a response based on the initial entities and the candidate entities. The assistant system may further send, to the client system in response to the query, instructions for presenting the response.

Certain technical challenges exist for achieving explainable conversational reasoning. One technical challenge may include accurately identifying relevant entities to a user query. The solution presented by the embodiments disclosed herein to address the above challenge may be associating walk paths on a knowledge graph with input contexts including dialog sates, sentence, and initial entities mentioned in the conversation and ranking candidate entities using a zero-shot relevance learning model, which result in more accurate relevant entities since comprehensive information is leveraged from the knowledge graph and input contexts and the zero-shot relevance learning model further refines such information. Another technical challenge may include training a robust conversational reasoning model. The solution presented by the embodiments disclosed herein to address this challenge may be a newly collected large-scale human-to-human multi-turn dialogs dataset where each mention of an entity in dialog is linked with its corresponding ground-truth knowledge graph path, which provides information as how conversational topics could jump across many different entities within multi-turn dialogs to train the conversational reasoning model.

Certain embodiments disclosed herein may provide one or more technical advantages. A technical advantage of the embodiments may include generating more natural and human-like responses as the conversational reasoning model is based on knowledge graph and input contexts including dialog sates, sentence, and initial entities mentioned in the conversation. Another technical advantage of the embodiments may include providing a natural way to explain how and why a response is generated because the walk paths on the knowledge graph are easy to interpret. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
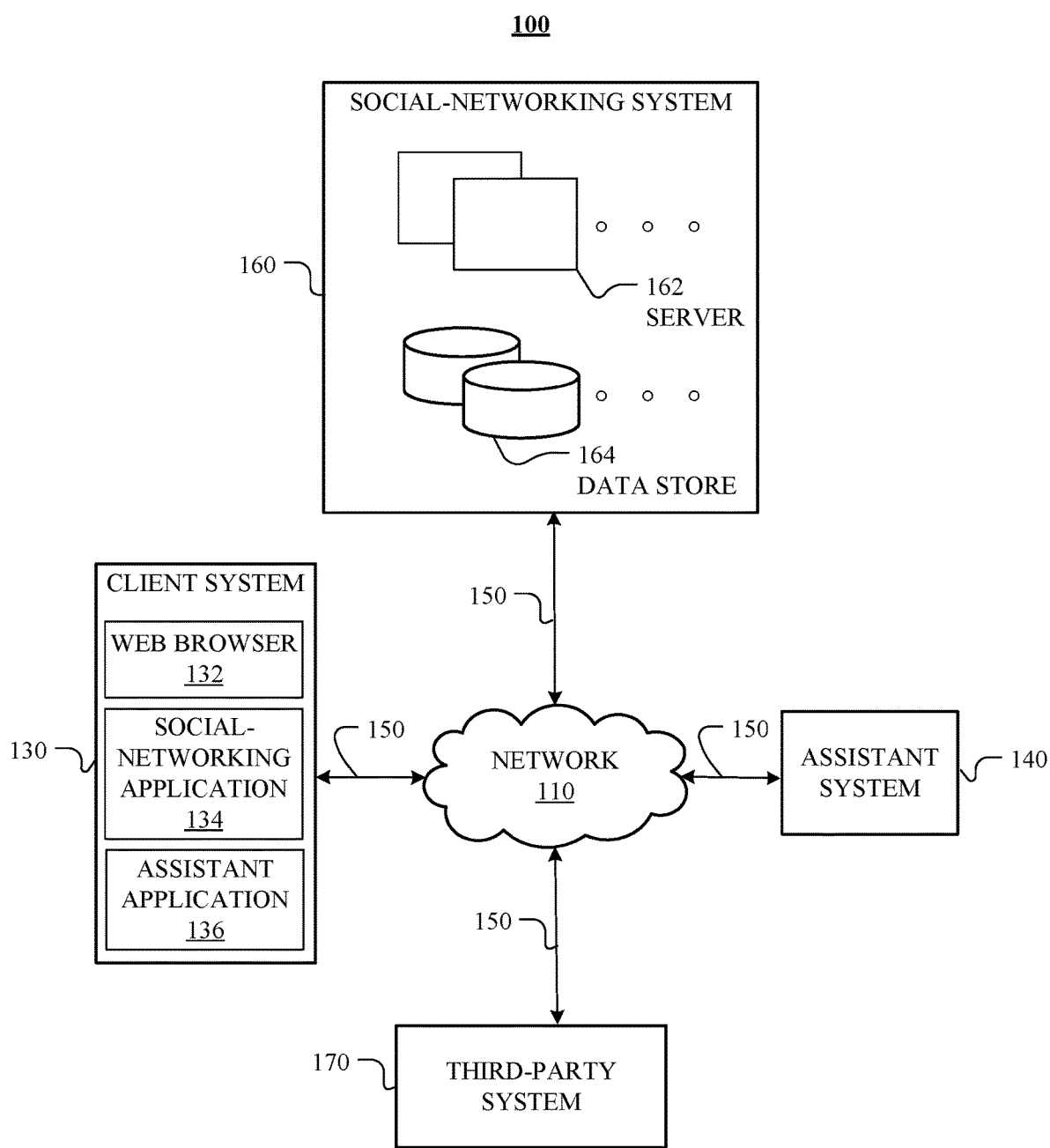
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual reality (VR) headset, augment reality (AR) smart glasses, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. patent application Ser. No. 16/153,574, filed 5 Oct. 2018, U.S. Design patent application No. 29/631,910, filed 3 Jan. 2018, U.S. Design patent application No. 29/631,747, filed 2 Jan. 2018, U.S. Design patent application No. 29/631,913, filed 3 Jan. 2018, and U.S. Design patent application No. 29/631,914, filed 3 Jan. 2018, each of which is incorporated by reference. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may provide input via different modalities. As an example and not by way of limitation, the modalities may include audio, text, image, video, motion, orientation, etc. The assistant application 136 may communicate the user input to the assistant system 140. Based on the user input, the assistant system 140 may generate responses. The assistant system 140 may send the generated responses to the assistant application 136. The assistant application 136 may then present the responses to the user at the client system 130. The presented responses may be based on different modalities such as audio, text, image, and video. As an example and not by way of limitation, the user may verbally ask the assistant application 136 about the traffic information (i.e., via an audio modality). The assistant application 136 may then communicate the request to the assistant system 140. The assistant system 140 may accordingly generate the result and send it back to the assistant application 136. The assistant application 136 may further present the result to the user in text.

In particular embodiments, an assistant system 140 may assist users to retrieve information from different sources. The assistant system 140 may also assist user to request services from different service providers. In particular embodiments, the assist system 140 may receive a user request for information or services via the assistant application 136 in the client system 130. The assist system 140 may use natural-language understanding to analyze the user request based on user's profile and other relevant information. The result of the analysis may comprise different entities associated with an online social network. The assistant system 140 may then retrieve information or request services associated with these entities. In particular embodiments, the assistant system 140 may interact with the social-networking system 160 and/or third-party system 170 when retrieving information or requesting services for the user. In particular embodiments, the assistant system 140 may generate a personalized communication content for the user using natural-language generating techniques. The personalized communication content may comprise, for example, the retrieved information or the status of the requested services. In particular embodiments, the assistant system 140 may enable the user to interact with it regarding the information or services in a stateful and multi-turn conversation by using dialog-management techniques. The functionality of the assistant system 140 is described in more detail in the discussion of FIG. 2 below.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, an assistant system 140, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow, for example, an assistant system 140 or a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
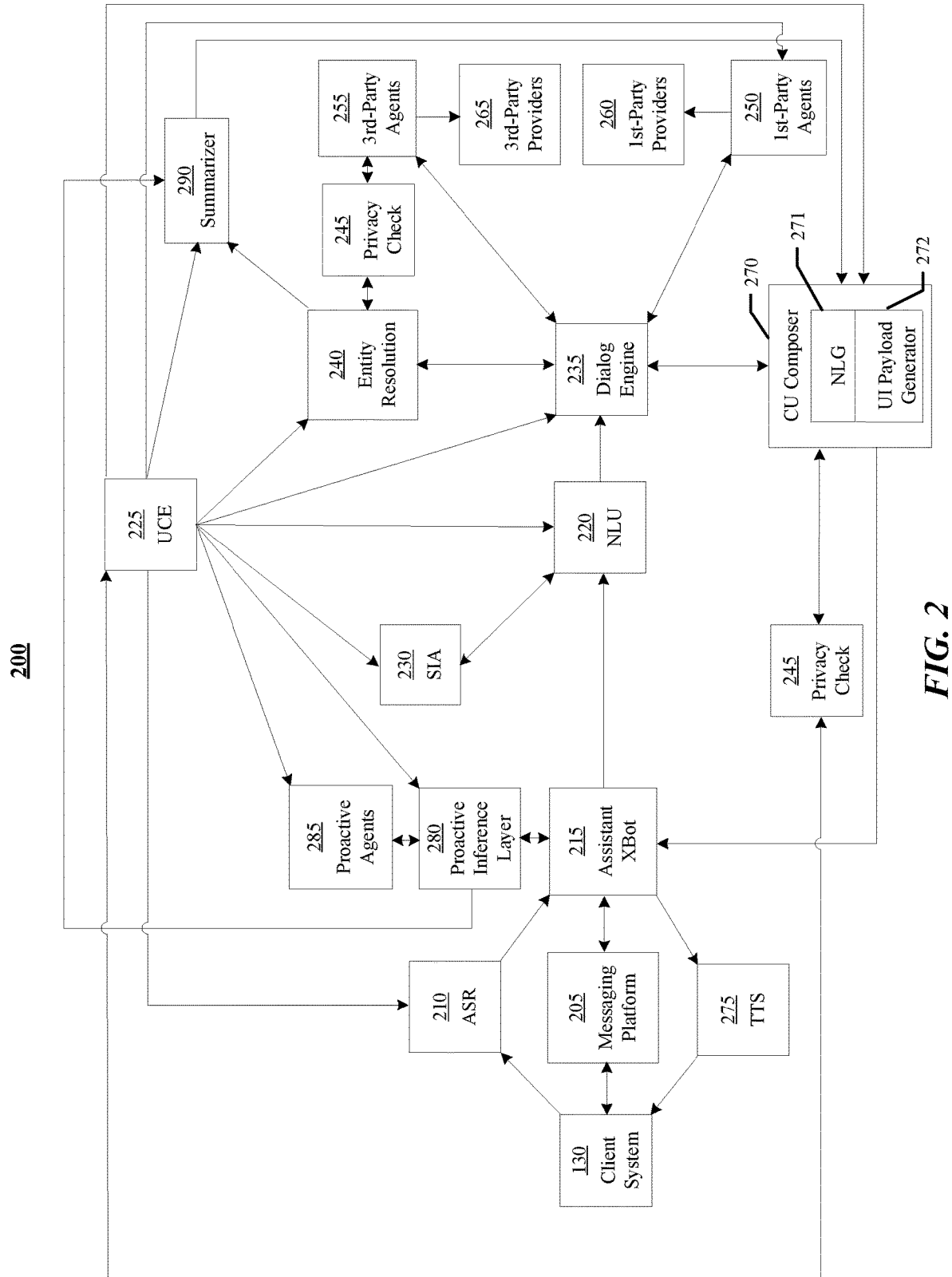
FIG. 2 illustrates an example architecture of the assistant system.

FIG. 2 illustrates an example architecture of the assistant system 140. In particular embodiments, the assistant system 140 may assist a user to obtain information or services. The assistant system 140 may enable the user to interact with it with multi-modal user input (such as voice, text, image, video, motion) in stateful and multi-turn conversations to get assistance. The assistant system 140 may create and store a user profile comprising both personal and contextual information associated with the user. In particular embodiments, the assistant system 140 may analyze the user input using natural-language understanding. The analysis may be based on the user profile for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation. Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute pre-authorized tasks that are relevant to user interests and preferences based on the user profile, at a time relevant for the user, without a user input. In particular embodiments, the assistant system 140 may check privacy settings to ensure that accessing a user's profile or other user information and executing different tasks are permitted subject to the user's privacy settings. More information on assisting users subject to privacy settings may be found in U.S. patent application Ser. No. 16/182,542, filed 6 Nov. 2018, which is incorporated by reference.

In particular embodiments, the assistant system 140 may receive a user input from the assistant application 136 in the client system 130 associated with the user. In particular embodiments, the user input may be a user generated input that is sent to the assistant system 140 in a single turn. If the user input is based on a text modality, the assistant system 140 may receive it at a messaging platform 205. If the user input is based on an audio modality (e.g., the user may speak to the assistant application 136 or send a video including speech to the assistant application 136), the assistant system 140 may process it using an automatic speech recognition (ASR) module 210 to convert the user input into text. If the user input is based on an image or video modality, the assistant system 140 may process it using optical character recognition techniques within the messaging platform 205 to convert the user input into text. The output of the messaging platform 205 or the ASR module 210 may be received at an assistant xbot 215. More information on handling user input based on different modalities may be found in U.S. patent application Ser. No. 16/053,600, filed 2 Aug. 2018, which is incorporated by reference.

In particular embodiments, the assistant xbot 215 may be a type of chat bot. The assistant xbot 215 may comprise a programmable service channel, which may be a software code, logic, or routine that functions as a personal assistant to the user. The assistant xbot 215 may work as the user's portal to the assistant system 140. The assistant xbot 215 may therefore be considered as a type of conversational agent. In particular embodiments, the assistant xbot 215 may send the textual user input to a natural-language understanding (NLU) module 220 to interpret the user input. In particular embodiments, the NLU module 220 may get information from a user context engine 225 and a semantic information aggregator (SIA) 230 to accurately understand the user input. The user context engine 225 may store the user profile of the user. The user profile of the user may comprise user-profile data including demographic information, social information, and contextual information associated with the user. The user-profile data may also include user interests and preferences on a plurality of topics, aggregated through conversations on news feed, search logs, messaging platform 205, etc. The usage of a user profile may be protected behind a privacy check module 245 to ensure that a user's information can be used only for his/her benefit, and not shared with anyone else. More information on user profiles may be found in U.S. patent application Ser. No. 15/967,239, filed 30 Apr. 2018, which is incorporated by reference. The semantic information aggregator 230 may provide ontology data associated with a plurality of pre-defined domains, intents, and slots to the NLU module 220. In particular embodiments, a domain may denote a social context of interaction, e.g., education. An intent may be an element in a pre-defined taxonomy of semantic intentions, which may indicate a purpose of a user interacting with the assistant system 140. In particular embodiments, an intent may be an output of the NLU module 220 if the user input comprises a text/speech input. The NLU module 220 may classify the text/speech input into a member of the pre-defined taxonomy, e.g., for the input "Play Beethoven's 5th," the NLU module 220 may classify the input as having the intent [IN:play_music]. In particular embodiments, a domain may be conceptually a namespace for a set of intents, e.g., music. A slot may be a named sub-string with the user input, representing a basic semantic entity. For example, a slot for "pizza" may be [SL:dish]. In particular embodiments, a set of valid or expected named slots may be conditioned on the classified intent. As an example and not by way of limitation, for [IN:play_music], a slot may be [SL:song_name]. The semantic information aggregator 230 may additionally extract information from a social graph, a knowledge graph, and a concept graph, and retrieve a user's profile from the user context engine 225. The semantic information aggregator 230 may further process information from these different sources by determining what information to aggregate, annotating n-grams of the user input, ranking the n-grams with confidence scores based on the aggregated information, formulating the ranked n-grams into features that can be used by the NLU module 220 for understanding the user input. More information on aggregating semantic information may be found in U.S. patent application Ser. No. 15/967,342, filed 30 Apr. 2018, which is incorporated by reference. Based on the output of the user context engine 225 and the semantic information aggregator 230, the NLU module 220 may identify a domain, an intent, and one or more slots from the user input in a personalized and context-aware manner. As an example and not by way of limitation, a user input may comprise "show me how to get to the coffee shop". The NLU module 220 may identify the particular Starbucks that the user wants to go based on the user's personal information and the associated contextual information. In particular embodiments, the NLU module 220 may comprise a lexicon of language and a parser and grammar rules to partition sentences into an internal representation. The NLU module 220 may also comprise one or more programs that perform naive semantics or stochastic semantic analysis to the use of pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the identified domain, intent, and one or more slots from the NLU module 220 may be sent to a dialog engine 235. In particular embodiments, the dialog engine 235 may manage the dialog state and flow of the conversation between the user and the assistant xbot 215. The dialog engine 235 may additionally store previous conversations between the user and the assistant xbot 215. In particular embodiments, the dialog engine 235 may communicate with an entity resolution module 240 to resolve entities associated with the one or more slots, which supports the dialog engine 235 to forward the flow of the conversation between the user and the assistant xbot 215. In particular embodiments, the entity resolution module 240 may access the social graph, the knowledge graph, and the concept graph when resolving the entities. Entities may include, for example, unique users or concepts, each of which may have a unique identifier (ID). As an example and not by way of limitation, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability. A confidence probability for an attribute value represents a probability that the value is accurate for the given attribute. Each attribute value may be also associated with a semantic weight. A semantic weight for an attribute value may represent how the value semantically appropriate for the given attribute considering all the available information. For example, the knowledge graph may comprise an entity of a movie "The Martian" (2015), which includes information that has been extracted from multiple content sources (e.g., Facebook, online encyclopedias, movie review sources, media databases, and entertainment content sources), and then deduped, resolved, and fused to generate the single unique record for the knowledge graph. The entity may be associated with a space attribute value which indicates the genre of the movie "The Martian" (2015). More information on the knowledge graph may be found in U.S. patent application Ser. No. 16/048,049, filed 27 Jul. 2018, and U.S. patent application Ser. No. 16/048, 101, filed 27 Jul. 2018, each of which is incorporated by reference. The entity resolution module 240 may additionally request a user profile of the user associated with the user input from the user context engine 225. In particular embodiments, the entity resolution module 240 may communicate with a privacy check module 245 to guarantee that the resolving of the entities does not violate privacy policies. In particular embodiments, the privacy check module 245 may use an authorization/privacy server to enforce privacy policies. As an example and not by way of limitation, an entity to be resolved may be another user who specifies in his/her privacy settings that his/her identity should not be searchable on the online social network, and thus the entity resolution module 240 may not return that user's identifier in response to a request. Based on the information obtained from the social graph, knowledge graph, concept graph, and user profile, and subject to applicable privacy policies, the entity resolution module 240 may therefore accurately resolve the entities associated with the user input in a personalized and context-aware manner. In particular embodiments, each of the resolved entities may be associated with one or more identifiers hosted by the social-networking system 160. As an example and not by way of limitation, an identifier may comprise a unique user identifier (ID). In particular embodiments, each of the resolved entities may be also associated with a confidence score. More information on resolving entities may be found in U.S. patent application Ser. No. 16/048,049, filed 27 Jul. 2018, and U.S. patent application Ser. No. 16/048,072, filed 27 Jul. 2018, each of which is incorporated by reference.

In particular embodiments, the dialog engine 235 may communicate with different agents based on the identified intent and domain, and the resolved entities. In particular embodiments, an agent may be an implementation that serves as a broker across a plurality of content providers for one domain. A content provider may be an entity responsible for carrying out an action associated with an intent or completing a task associated with the intent. As an example and not by way of limitation, multiple device-specific implementations (e.g., real-time calls for a client system 130 or a messaging application on the client system 130) may be handled internally by a single agent. Alternatively, these device-specific implementations may be handled by multiple agents associated with multiple domains. In particular embodiments, the agents may comprise first-party agents 250 and third-party agents 255. In particular embodiments, first-party agents 250 may comprise internal agents that are accessible and controllable by the assistant system 140 (e.g. agents associated with services provided by the online social network (Messenger, Instagram)). In particular embodiments, third-party agents 255 may comprise external agents that the assistant system 140 has no control over (e.g., third-party online music application agents, ticket sales agents). The first-party agents 250 may be associated with first-party providers 260 that provide content objects and/or services hosted by the social-networking system 160. The third-party agents 255 may be associated with third-party providers 265 that provide content objects and/or services hosted by the third-party system 170.

In particular embodiments, the communication from the dialog engine 235 to the first-party agents 250 may comprise requesting particular content objects and/or services provided by the first-party providers 260. As a result, the first-party agents 250 may retrieve the requested content objects from the first-party providers 260 and/or execute tasks that command the first-party providers 260 to perform the requested services. In particular embodiments, the communication from the dialog engine 235 to the third-party agents 255 may comprise requesting particular content objects and/or services provided by the third-party providers 265. As a result, the third-party agents 255 may retrieve the requested content objects from the third-party providers 265 and/or execute tasks that command the third-party providers 265 to perform the requested services. The third-party agents 255 may access the privacy check module 245 to guarantee no privacy violations before interacting with the third-party providers 265. As an example and not by way of limitation, the user associated with the user input may specify in his/her privacy settings that his/her profile information is invisible to any third-party content providers. Therefore, when retrieving content objects associated with the user input from the third-party providers 265, the third-party agents 255 may complete the retrieval without revealing to the third-party providers 265 which user is requesting the content objects.

In particular embodiments, each of the first-party agents 250 or third-party agents 255 may be designated for a particular domain. As an example and not by way of limitation, the domain may comprise weather, transportation, music, etc. In particular embodiments, the assistant system 140 may use a plurality of agents collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, each of the first-party agents 250 or third-party agents 255 may retrieve a user profile from the user context engine 225 to execute tasks in a personalized and context-aware manner. As an example and not by way of limitation, a user input may comprise "book me a ride to the airport." A transportation agent may execute the task of booking the ride. The transportation agent may retrieve the user profile of the user from the user context engine 225 before booking the ride. For example, the user profile may indicate that the user prefers taxis, so the transportation agent may book a taxi for the user. As another example, the contextual information associated with the user profile may indicate that the user is in a hurry so the transportation agent may book a ride from a ride-sharing service for the user since it may be faster to get a car from a ride-sharing service than a taxi company. In particular embodiment, each of the first-party agents 250 or third-party agents 255 may take into account other factors when executing tasks. As an example and not by way of limitation, other factors may comprise price, rating, efficiency, partnerships with the online social network, etc.

In particular embodiments, the dialog engine 235 may communicate with a conversational understanding composer (CU composer) 270. The dialog engine 235 may send the requested content objects and/or the statuses of the requested services to the CU composer 270. In particular embodiments, the dialog engine 235 may send the requested content objects and/or the statuses of the requested services as a <k, c, u, d> tuple, in which k indicates a knowledge source, c indicates a communicative goal, u indicates a user model, and d indicates a discourse model. In particular embodiments, the CU composer 270 may comprise a natural-language generator (NLG) 271 and a user interface (UI) payload generator 272. The natural-language generator 271 may generate a communication content based on the output of the dialog engine 235. In particular embodiments, the NLG 271 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator 271 to build complex concepts/roles from atomic ones. In particular embodiments, the content determination component may perform the following tasks to determine the communication content. The first task may comprise a translation task, in which the input to the natural-language generator 271 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the natural-language generator 271. The sentence planner may determine the organization of the communication content to make it human understandable. The surface realization component may determine specific words to use, the sequence of the sentences, and the style of the communication content. The UI payload generator 272 may determine a preferred modality of the communication content to be presented to the user. In particular embodiments, the CU composer 270 may communicate with the privacy check module 245 to make sure the generation of the communication content follows the privacy policies. In particular embodiments, the CU composer 270 may retrieve a user profile from the user context engine 225 when generating the communication content and determining the modality of the communication content. As a result, the communication content may be more natural, personalized, and context-aware for the user. As an example and not by way of limitation, the user profile may indicate that the user likes short sentences in conversations so the generated communication content may be based on short sentences. As another example and not by way of limitation, the contextual information associated with the user profile may indicated that the user is using a device that only outputs audio signals so the UI payload generator 272 may determine the modality of the communication content as audio. More information on natural-language generation may be found in U.S. patent application Ser. No. 15/967,279, filed 30 Apr. 2018, and U.S. patent application Ser. No. 15/966,455, filed 30 Apr. 2018, each of which is incorporated by reference.

In particular embodiments, the CU composer 270 may send the generated communication content to the assistant xbot 215. In particular embodiments, the assistant xbot 215 may send the communication content to the messaging platform 205. The messaging platform 205 may further send the communication content to the client system 130 via the assistant application 136. In alternative embodiments, the assistant xbot 215 may send the communication content to a text-to-speech (TTS) module 275. The TTS module 275 may convert the communication content to an audio clip. The TTS module 275 may further send the audio clip to the client system 130 via the assistant application 136.

In particular embodiments, the assistant xbot 215 may interact with a proactive inference layer 280 without receiving a user input. The proactive inference layer 280 may infer user interests and preferences based on the user profile that is retrieved from the user context engine 225. In particular embodiments, the proactive inference layer 280 may further communicate with proactive agents 285 regarding the inference. The proactive agents 285 may execute proactive tasks based on the inference. As an example and not by way of limitation, the proactive tasks may comprise sending content objects or providing services to the user. In particular embodiments, each proactive task may be associated with an agenda item. The agenda item may comprise a recurring item such as a daily digest. The agenda item may also comprise a one-time item. In particular embodiments, a proactive agent 285 may retrieve the user profile from the user context engine 225 when executing the proactive task. Therefore, the proactive agent 285 may execute the proactive task in a personalized and context-aware manner. As an example and not by way of limitation, the proactive inference layer may infer that the user likes a particular band and the proactive agent 285 may generate a recommendation of the particular band's new song/album to the user.

In particular embodiments, the proactive agent 285 may generate candidate entities associated with the proactive task based on a user profile. The generation may be based on a straightforward backend query using deterministic filters to retrieve the candidate entities from a structured data store. The generation may be alternatively based on a machine-learning model that is trained based on the user profile, entity attributes, and relevance between users and entities. As an example and not by way of limitation, the machine-learning model may be based on support vector machines (SVM). As another example and not by way of limitation, the machine-learning model may be based on a regression model. As another example and not by way of limitation, the machine-learning model may be based on a deep convolutional neural network (DCNN). In particular embodiments, the proactive agent 285 may also rank the generated candidate entities based on the user profile and the content associated with the candidate entities. The ranking may be based on the similarities between a user's interests and the candidate entities. As an example and not by way of limitation, the assistant system 140 may generate a feature vector representing a user's interest and feature vectors representing the candidate entities. The assistant system 140 may then calculate similarity scores (e.g., based on cosine similarity) between the feature vector representing the user's interest and the feature vectors representing the candidate entities. The ranking may be alternatively based on a ranking model that is trained based on user feedback data.

In particular embodiments, the proactive task may comprise recommending the candidate entities to a user. The proactive agent 285 may schedule the recommendation, thereby associating a recommendation time with the recommended candidate entities. The recommended candidate entities may be also associated with a priority and an expiration time. In particular embodiments, the recommended candidate entities may be sent to a proactive scheduler. The proactive scheduler may determine an actual time to send the recommended candidate entities to the user based on the priority associated with the task and other relevant factors (e.g., clicks and impressions of the recommended candidate entities). In particular embodiments, the proactive scheduler may then send the recommended candidate entities with the determined actual time to an asynchronous tier. The asynchronous tier may temporarily store the recommended candidate entities as a job. In particular embodiments, the asynchronous tier may send the job to the dialog engine 235 at the determined actual time for execution. In alternative embodiments, the asynchronous tier may execute the job by sending it to other surfaces (e.g., other notification services associated with the social-networking system 160). In particular embodiments, the dialog engine 235 may identify the dialog intent, state, and history associated with the user. Based on the dialog intent, the dialog engine 235 may select some candidate entities among the recommended candidate entities to send to the client system 130. In particular embodiments, the dialog state and history may indicate if the user is engaged in an ongoing conversation with the assistant xbot 215. If the user is engaged in an ongoing conversation and the priority of the task of recommendation is low, the dialog engine 235 may communicate with the proactive scheduler to reschedule a time to send the selected candidate entities to the client system 130. If the user is engaged in an ongoing conversation and the priority of the task of recommendation is high, the dialog engine 235 may initiate a new dialog session with the user in which the selected candidate entities may be presented. As a result, the interruption of the ongoing conversation may be prevented. When it is determined that sending the selected candidate entities is not interruptive to the user, the dialog engine 235 may send the selected candidate entities to the CU composer 270 to generate a personalized and context-aware communication content comprising the selected candidate entities, subject to the user's privacy settings. In particular embodiments, the CU composer 270 may send the communication content to the assistant xbot 215 which may then send it to the client system 130 via the messaging platform 205 or the TTS module 275. More information on proactively assisting users may be found in U.S. patent application Ser. No. 15/967,193, filed 30 Apr. 2018, and U.S. patent application Ser. No. 16/036,827, filed 16 Jul. 2018, each of which is incorporated by reference.

In particular embodiments, the assistant xbot 215 may communicate with a proactive agent 285 in response to a user input. As an example and not by way of limitation, the user may ask the assistant xbot 215 to set up a reminder. The assistant xbot 215 may request a proactive agent 285 to set up such reminder and the proactive agent 285 may proactively execute the task of reminding the user at a later time.

In particular embodiments, the assistant system 140 may comprise a summarizer 290. The summarizer 290 may provide customized news feed summaries to a user. In particular embodiments, the summarizer 290 may comprise a plurality of meta agents. The plurality of meta agents may use the first-party agents 250, third-party agents 255, or proactive agents 285 to generated news feed summaries. In particular embodiments, the summarizer 290 may retrieve user interests and preferences from the proactive inference layer 280. The summarizer 290 may then retrieve entities associated with the user interests and preferences from the entity resolution module 240. The summarizer 290 may further retrieve a user profile from the user context engine 225. Based on the information from the proactive inference layer 280, the entity resolution module 240, and the user context engine 225, the summarizer 290 may generate personalized and context-aware summaries for the user. In particular embodiments, the summarizer 290 may send the summaries to the CU composer 270. The CU composer 270 may process the summaries and send the processing results to the assistant xbot 215. The assistant xbot 215 may then send the processed summaries to the client system 130 via the messaging platform 205 or the TTS module 275. More information on summarization may be found in U.S. patent application Ser. No. 15/967,290, filed 30 Apr. 2018, which is incorporated by reference.

Figure 3:
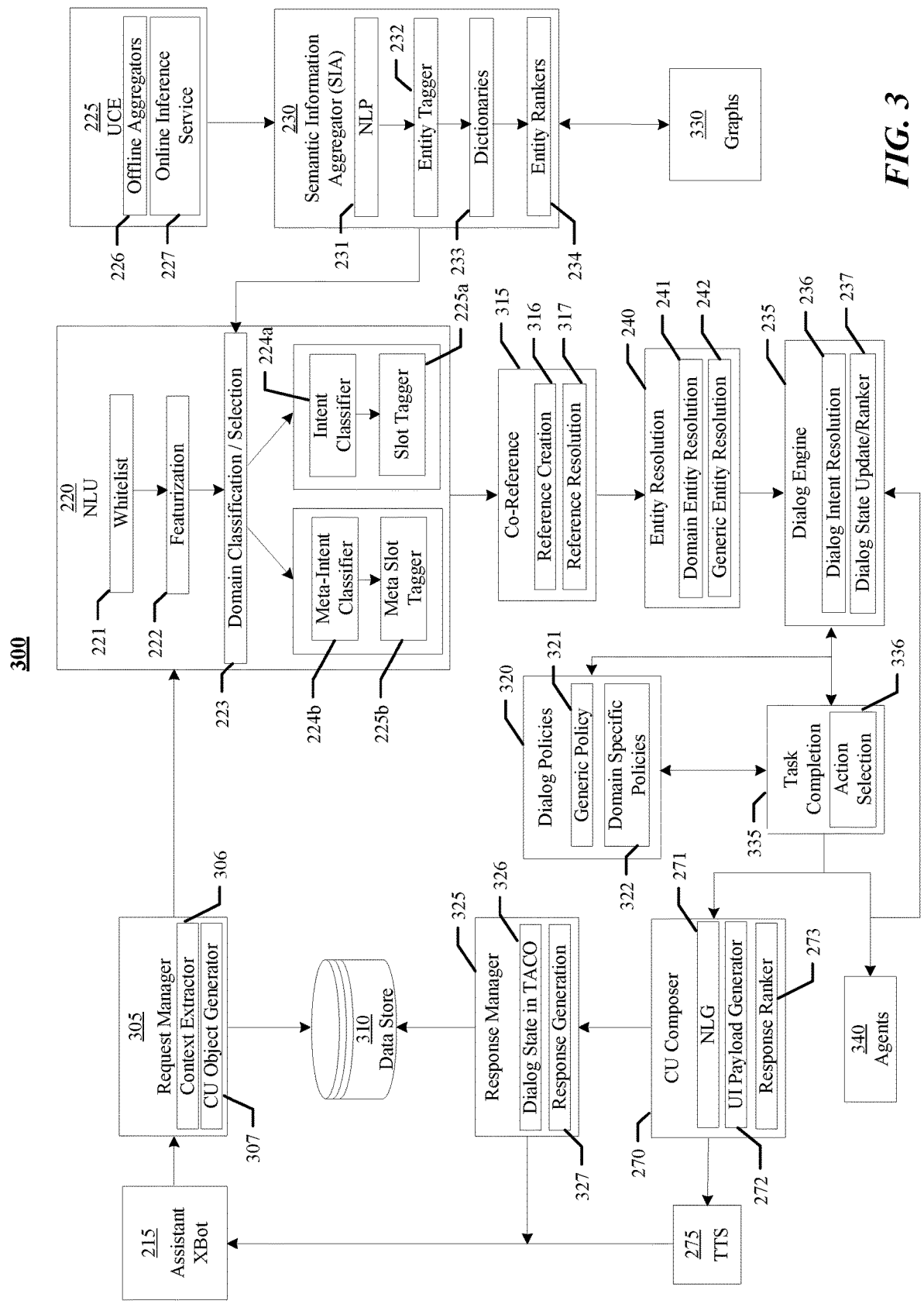
FIG. 3 illustrates an example diagram flow of responding to a user request by the assistant system.

FIG. 3 illustrates an example diagram flow of responding to a user request by the assistant system 140. In particular embodiments, the assistant xbot 215 may access a request manager 305 upon receiving the user request. The request manager 305 may comprise a context extractor 306 and a conversational understanding object generator (CU object generator) 307. The context extractor 306 may extract contextual information associated with the user request. The context extractor 306 may also update contextual information based on the assistant application 136 executing on the client system 130. As an example and not by way of limitation, the update of contextual information may comprise content items are displayed on the client system 130. As another example and not by way of limitation, the update of contextual information may comprise whether an alarm is set on the client system 130. As another example and not by way of limitation, the update of contextual information may comprise whether a song is playing on the client system 130. The CU object generator 307 may generate particular content objects relevant to the user request. The content objects may comprise dialog-session data and features associated with the user request, which may be shared with all the modules of the assistant system 140. In particular embodiments, the request manager 305 may store the contextual information and the generated content objects in data store 310 which is a particular data store implemented in the assistant system 140.

In particular embodiments, the request manger 305 may send the generated content objects to the NLU module 220. The NLU module 220 may perform a plurality of steps to process the content objects. At step 221, the NLU module 220 may generate a whitelist for the content objects. In particular embodiments, the whitelist may comprise interpretation data matching the user request. At step 222, the NLU module 220 may perform a featurization based on the whitelist. At step 223, the NLU module 220 may perform domain classification/selection on user request based on the features resulted from the featurization to classify the user request into predefined domains. The domain classification/selection results may be further processed based on two related procedures. At step 224*a*, the NLU module 220 may process the domain classification/selection result using an intent classifier. The intent classifier may determine the user's intent associated with the user request. In particular embodiments, there may be one intent classifier for each domain to determine the most possible intents in a given domain. As an example and not by way of limitation, the intent classifier may be based on a machine-learning model that may take the domain classification/selection result as input and calculate a probability of the input being associated with a particular predefined intent. At step 224b, the NLU module may process the domain classification/selection result using a meta-intent classifier. The meta-intent classifier may determine categories that describe the user's intent. In particular embodiments, intents that are common to multiple domains may be processed by the meta-intent classifier. As an example and not by way of limitation, the meta-intent classifier may be based on a machine-learning model that may take the domain classification/selection result as input and calculate a probability of the input being associated with a particular predefined meta-intent. At step 225a, the NLU module 220 may use a slot tagger to annotate one or more slots associated with the user request. In particular embodiments, the slot tagger may annotate the one or more slots for the n-grams of the user request. At step 225b, the NLU module 220 may use a meta slot tagger to annotate one or more slots for the classification result from the meta-intent classifier. In particular embodiments, the meta slot tagger may tag generic slots such as references to items (e.g., the first), the type of slot, the value of the slot, etc. As an example and not by way of limitation, a user request may comprise "change 500 dollars in my account to Japanese yen." The intent classifier may take the user request as input and formulate it into a vector. The intent classifier may then calculate probabilities of the user request being associated with different predefined intents based on a vector comparison between the vector representing the user request and the vectors representing different predefined intents. In a similar manner, the slot tagger may take the user request as input and formulate each word into a vector. The intent classifier may then calculate probabilities of each word being associated with different predefined slots based on a vector comparison between the vector representing the word and the vectors representing different predefined slots. The intent of the user may be classified as "changing money". The slots of the user request may comprise "500", "dollars", "account", and "Japanese yen". The meta-intent of the user may be classified as "financial service". The meta slot may comprise "finance".

In particular embodiments, the NLU module 220 may improve the domain classification/selection of the content objects by extracting semantic information from the semantic information aggregator 230. In particular embodiments, the semantic information aggregator 230 may aggregate semantic information in the following way. The semantic information aggregator 230 may first retrieve information from the user context engine 225. In particular embodiments, the user context engine 225 may comprise offline aggregators 226 and an online inference service 227. The offline aggregators 226 may process a plurality of data associated with the user that are collected from a prior time window. As an example and not by way of limitation, the data may include news feed posts/comments, interactions with news feed posts/comments, Instagram posts/comments, search history, etc. that are collected from a prior 90-day window. The processing result may be stored in the user context engine 225 as part of the user profile. The online inference service 227 may analyze the conversational data associated with the user that are received by the assistant system 140 at a current time. The analysis result may be stored in the user context engine 225 also as part of the user profile. In particular embodiments, both the offline aggregators 226 and online inference service 227 may extract personalization features from the plurality of data. The extracted personalization features may be used by other modules of the assistant system 140 to better understand user input. In particular embodiments, the semantic information aggregator 230 may then process the retrieved information, i.e., a user profile, from the user context engine 225 in the following steps. At step 231, the semantic information aggregator 230 may process the retrieved information from the user context engine 225 based on natural-language processing (NLP). In particular embodiments, the semantic information aggregator 230 may tokenize text by text normalization, extract syntax features from text, and extract semantic features from text based on NLP. The semantic information aggregator 230 may additionally extract features from contextual information, which is accessed from dialog history between a user and the assistant system 140. The semantic information aggregator 230 may further conduct global word embedding, domain-specific embedding, and/or dynamic embedding based on the contextual information. At step 232, the processing result may be annotated with entities by an entity tagger. Based on the annotations, the semantic information aggregator 230 may generate dictionaries for the retrieved information at step 233. In particular embodiments, the dictionaries may comprise global dictionary features which can be updated dynamically offline. At step 234, the semantic information aggregator 230 may rank the entities tagged by the entity tagger. In particular embodiments, the semantic information aggregator 230 may communicate with different graphs 330 including social graph, knowledge graph, and concept graph to extract ontology data that is relevant to the retrieved information from the user context engine 225. In particular embodiments, the semantic information aggregator 230 may aggregate the user profile, the ranked entities, and the information from the graphs 330. The semantic information aggregator 230 may then send the aggregated information to the NLU module 220 to facilitate the domain classification/selection.

In particular embodiments, the output of the NLU module 220 may be sent to a co-reference module 315 to interpret references of the content objects associated with the user request. In particular embodiments, the co-reference module 315 may be used to identify an item to which the user request refers. The co-reference module 315 may comprise reference creation 316 and reference resolution 317. In particular embodiments, the reference creation 316 may create references for entities determined by the NLU module 220. The reference resolution 317 may resolve these references accurately. As an example and not by way of limitation, a user request may comprise "find me the nearest grocery store and direct me there". The co-reference module 315 may interpret "there" as "the nearest grocery store". In particular embodiments, the co-reference module 315 may access the user context engine 225 and the dialog engine 235 when necessary to interpret references with improved accuracy.

In particular embodiments, the identified domains, intents, meta-intents, slots, and meta slots, along with the resolved references may be sent to the entity resolution module 240 to resolve relevant entities. The entity resolution module 240 may execute generic and domain-specific entity resolution. In particular embodiments, the entity resolution module 240 may comprise domain entity resolution 241 and generic entity resolution 242. The domain entity resolution 241 may resolve the entities by categorizing the slots and meta slots into different domains. In particular embodiments, entities may be resolved based on the ontology data extracted from the graphs 330. The ontology data may comprise the structural relationship between different slots/meta-slots and domains. The ontology may also comprise information of how the slots/meta-slots may be grouped, related within a hierarchy where the higher level comprises the domain, and subdivided according to similarities and differences. The generic entity resolution 242 may resolve the entities by categorizing the slots and meta slots into different generic topics. In particular embodiments, the resolving may be also based on the ontology data extracted from the graphs 330. The ontology data may comprise the structural relationship between different slots/meta-slots and generic topics. The ontology may also comprise information of how the slots/meta-slots may be grouped, related within a hierarchy where the higher level comprises the topic, and subdivided according to similarities and differences. As an example and not by way of limitation, in response to the input of an inquiry of the advantages of a particular brand of electric car, the generic entity resolution 242 may resolve the referenced brand of electric car as vehicle and the domain entity resolution 241 may resolve the referenced brand of electric car as electric car.

In particular embodiments, the output of the entity resolution module 240 may be sent to the dialog engine 235 to forward the flow of the conversation with the user. The dialog engine 235 may comprise dialog intent resolution 236 and dialog state update/ranker 237. In particular embodiments, the dialog intent resolution 236 may resolve the user intent associated with the current dialog session based on dialog history between the user and the assistant system 140. The dialog intent resolution 236 may map intents determined by the NLU module 220 to different dialog intents. The dialog intent resolution 236 may further rank dialog intents based on signals from the NLU module 220, the entity resolution module 240, and dialog history between the user and the assistant system 140. In particular embodiments, the dialog state update/ranker 237 may update/rank the dialog state of the current dialog session. As an example and not by way of limitation, the dialog state update/ranker 237 may update the dialog state as "completed" if the dialog session is over. As another example and not by way of limitation, the dialog state update/ranker 237 may rank the dialog state based on a priority associated with it.

In particular embodiments, the dialog engine 235 may communicate with a task completion module 335 about the dialog intent and associated content objects. In particular embodiments, the task completion module 335 may rank different dialog hypotheses for different dialog intents. The task completion module 335 may comprise an action selection component 336. In particular embodiments, the dialog engine 235 may additionally check against dialog policies 320 regarding the dialog state. In particular embodiments, a dialog policy 320 may comprise a data structure that describes an execution plan of an action by an agent 340. An agent 340 may select among registered content providers to complete the action. The data structure may be constructed by the dialog engine 235 based on an intent and one or more slots associated with the intent. A dialog policy 320 may further comprise multiple goals related to each other through logical operators. In particular embodiments, a goal may be an outcome of a portion of the dialog policy and it may be constructed by the dialog engine 235. A goal may be represented by an identifier (e.g., string) with one or more named arguments, which parameterize the goal. As an example and not by way of limitation, a goal with its associated goal argument may be represented as {confirm_artist, args: {artist: "Madonna"}}. In particular embodiments, a dialog policy may be based on a tree-structured representation, in which goals are mapped to leaves of the tree. In particular embodiments, the dialog engine 235 may execute a dialog policy 320 to determine the next action to carry out. The dialog policies 320 may comprise generic policy 321 and domain specific policies 322, both of which may guide how to select the next system action based on the dialog state. In particular embodiments, the task completion module 335 may communicate with dialog policies 320 to obtain the guidance of the next system action. In particular embodiments, the action selection component 336 may therefore select an action based on the dialog intent, the associated content objects, and the guidance from dialog policies 320.

In particular embodiments, the output of the task completion module 335 may be sent to the CU composer 270. In alternative embodiments, the selected action may require one or more agents 340 to be involved. As a result, the task completion module 335 may inform the agents 340 about the selected action. Meanwhile, the dialog engine 235 may receive an instruction to update the dialog state. As an example and not by way of limitation, the update may comprise awaiting agents' response. In particular embodiments, the CU composer 270 may generate a communication content for the user using the NLG 271 based on the output of the task completion module 335. In particular embodiments, the NLG 271 may use different language models and/or language templates to generate natural language outputs. The generation of natural language outputs may be application specific. The generation of natural language outputs may be also personalized for each user. The CU composer 270 may also determine a modality of the generated communication content using the UI payload generator 272. Since the generated communication content may be considered as a response to the user request, the CU composer 270 may additionally rank the generated communication content using a response ranker 273. As an example and not by way of limitation, the ranking may indicate the priority of the response.

In particular embodiments, the output of the CU composer 270 may be sent to a response manager 325. The response manager 325 may perform different tasks including storing/updating the dialog state 326 retrieved from data store 310 and generating responses 327. In particular embodiments, the output of CU composer 270 may comprise one or more of natural-language strings, speech, actions with parameters, or rendered images or videos that can be displayed in a VR headset or AR smart glass. As a result, the response manager 325 may determine what tasks to perform based on the output of CU composer 270. In particular embodiments, the generated response and the communication content may be sent to the assistant xbot 215. In alternative embodiments, the output of the CU composer 270 may be additionally sent to the TTS module 275 if the determined modality of the communication content is audio. The speech generated by the TTS module 275 and the response generated by the response manager 325 may be then sent to the assistant xbot 215.

The embodiments disclosed herein may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Conversational Reasoning with Knowledge Graph Paths for Assistant Systems

In particular embodiments, the assistant system 140 may use a conversational reasoning model to generate responses to a user in a dialog session. The conversational reasoning model may strategically traverse through a large-scale common-fact knowledge graph (KG) to introduce engaging and contextually diverse entities and attributes. The conversational reasoning model is learned based on a new open-ended Dialog↔KG parallel corpus called OpenDialKG, where each utterance from 15K human-to-human roleplaying dialogs is manually annotated with ground-truth reference to corresponding entities and paths from a large-scale KG with over one million facts. The conversational reasoning model, referred as the DialKG Walker model, may learn the symbolic transitions of dialog contexts as structured traversals over KG and predict natural entities to introduce given previous dialog contexts via a novel domain-agnostic, attention-based graph path decoder. Automatic and human evaluations show that the model may retrieve more natural and human-like responses than the state-of-the-art baselines or rule-based models, in both in-domain and cross-domain tasks. The model may also generate a KG walk path for each entity retrieved, providing a natural way to explain conversational reasoning. Although this disclosure describes particular conversational reasoning via a particular system in a particular manner, this disclosure contemplates any suitable conversational reasoning via any suitable system in any suitable manner.

In particular embodiments, the assistant system 140 may receive, from a client system 130 associated with a user, a query from the user. The assistant system 140 may then access a knowledge graph comprising a plurality of nodes and a plurality of edges connecting the nodes. Each node may correspond to an entity and each edge may correspond to a relationship between the entities corresponding to the connected nodes. In particular embodiments, the assistant system 140 may determine, based on the query, one or more initial entities associated with the query. The assistant system 140 may then select, by a conversational reasoning model, one or more candidate nodes from the knowledge graph corresponding to one or more candidate entities, respectively. Each candidate node may be selected based on the nodes corresponding to the initial entities, one or more dialog states associated with the query, and a context associated with the query. In particular embodiments, the assistant system 140 may generate a response based on the initial entities and the candidate entities. The assistant system 140 may further send, to the client system 130 in response to the query, instructions for presenting the response.

Introduction

The key element of an open-ended dialog system may be its ability to understand conversational contexts and to respond naturally by introducing relevant entities and attributes, which often leads to increased engagement and coherent interactions (Chen et al., 2018). While a large-scale knowledge graph (KG) includes vast knowledge of all the related entities connected via one or more factual connections from conversational contexts, the core challenge may be in the domain-agnostic and scalable prediction of a small subset from those reachable entities that follows natural conceptual threads that can keep conversations engaging and meaningful. Hence, the embodiments disclosed herein study a data-driven reasoning model that map dialog transitions with KG paths, aimed at identifying a subset of ideal entities to mention as a response to previous dialog contexts. In particular embodiments, the conversational reasoning model may be based on one or more machine-learning models. The one or more machine-learning models may comprise at least a long-short term memory (LSTM) model.

Figure 4A:
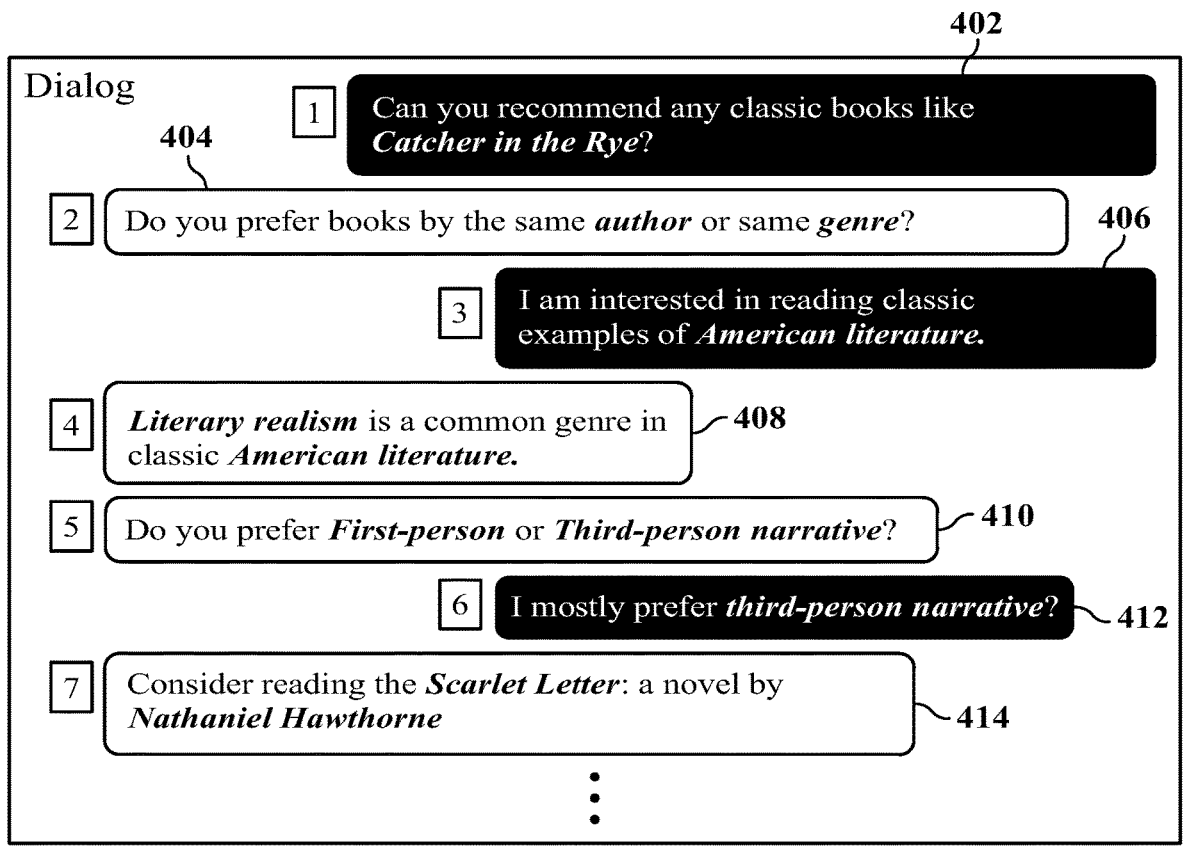
FIG. 4A illustrates a motivating dialog example between two conversation participants.
Figure 4B:
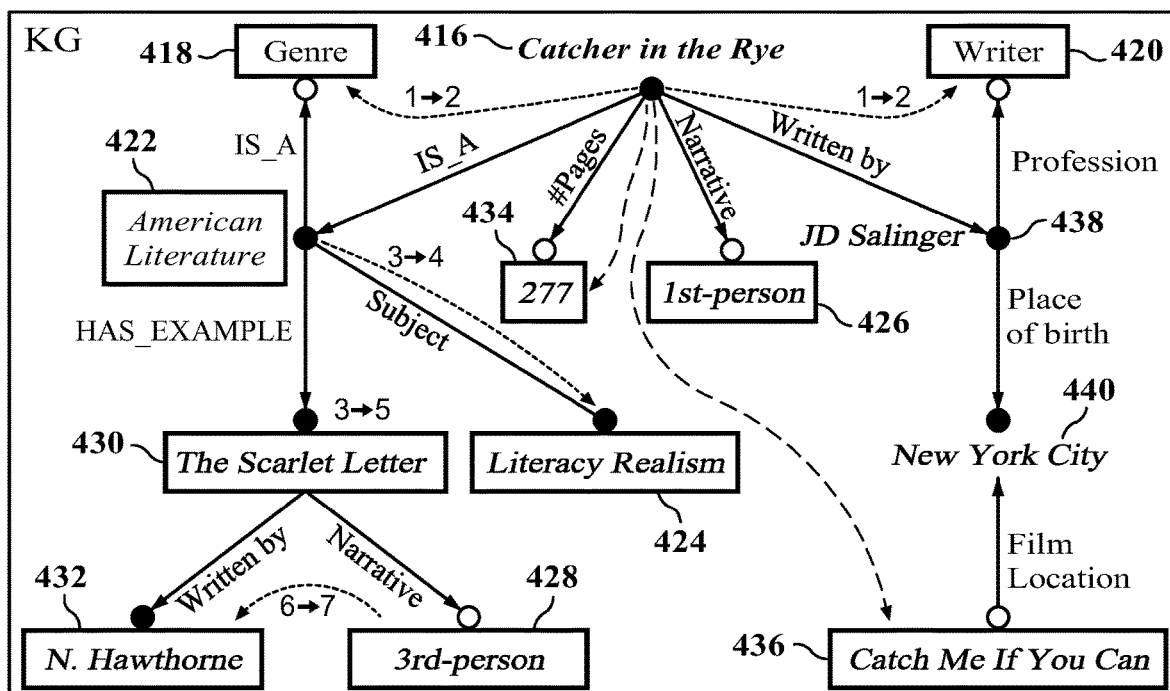
FIG. 4B illustrates an example span of multiple KG entities corresponding to the dialog example.

FIGS. 4A-4B illustrates an example conversational reasoning with a parallel dialog and knowledge graph corpus. FIG. 4A illustrates a motivating dialog example between two conversation participants. The dialog example spans multiple related KG entities from a starting seed entity *The Catcher in the Rye*. FIG. 4B illustrates an example span of multiple KG entities corresponding to the dialog example. As an example and not by way of limitation, a user may submit a query 402 which is "can you recommend any classic books like Catcher in the Rye?" The assistant system 140 may generate a response 404 which is "do you prefer books by the same author or same genre?" The user's reply 406 may be "I am interested in reading classic examples of American literature." The assistant system 140 may provide a response 408 which is "literary realism is a common genre in classic American literature" and a question 410 which is "do you prefer first-person or third-person narrative?" The user's answer 412 may be "I mostly prefer third-person narrative." The assistant system 140 may further generate a response 414 as "consider reading the Scarlet Letter: a novel by Nathaniel Hawthorne." Specifically, it may be observed in FIG. 4B that there exists a small subset of walkable patterns within a KG or a preferred sequence of graph traversal steps which often leads to more engaging entities or attributes than others (e.g. *Literacy Realism, Nathaniel Hawthorne,* etc. vs. *Catch Me If You Can,* 277, etc. —all connected via one- or multi-hop factual connections). As an example and not by way of limitation, there are may be steps from node "The Catcher in the Rye" 416 to node "Genre" 418 and node "Writer" 420. The user's feedback may help direct steps to node "American Literature" 422 and node "Literacy Realism" 424. The steps may further include those to node "1st-person" 426 and "3rd-person" 428. The user's feedback may help direct steps to node "The Scarlet Letter" 430 and "N. Hawthorne" 432. Besides these steps, there may be non-ideal steps, e.g., from node "The Catcher in the Rye" 416 to node "277" 434, or to node "Catch Me if You Can" 436, or to node "JD Salinger" 438 and node "New York City" 440. Diverse topical jumps across open-ended multi-turn dialogs are annotated and grounded with a large-scale common-fact KG. To generate a KG entity response at each dialog turn, the model learns walkable paths within KG that lead to engaging and natural topics or entities given dialog context, while pruning non-ideal (albeit factually correct) KG paths among 1M+ candidate facts. Note also that the walkable degree of each entity varies by dialog contexts and domains, thus making conventional rule-based or entity-to-entity learning approaches intractable or not scalable for open-ended dialogs with 1M+ candidate facts. Therefore, pruning the search space for entities based on dialog contexts and their relation-based walk paths may be a crucial step in operating knowledge-augmented dialog systems at scale.

To this end, the embodiments disclosed herein propose a new model called DialKG Walker that can learn natural knowledge paths among entities mentioned over dialog contexts, and reason grounded on a large commonsense KG. Specifically, the embodiments disclosed herein propose a novel graph decoder that attends on viable KG paths to predict the most relevant entities from a KG, by associating these paths with the given input contexts: dialog, sentence, and a set of starting KG entities mentioned in the previous turn. The embodiments disclosed herein then build a parallel zero-shot learning model that predicts entities in the KG embeddings space, and rank candidate entities based on decoded graph path output. Based on the ranked candidate entities, generating the response may be further based on one or more language templates. Associating walk paths on a knowledge graph with input contexts including dialog sates, sentence, and initial entities mentioned in the conversation and ranking candidate entities using a zero-shot relevance learning model may be effective solutions for addressing the technical challenge of accurately identifying relevant entities to a user query, as such solutions may result in more accurate relevant entities for leveraging comprehensive information from the knowledge graph and input contexts and further refining such information by the zero-shot relevance learning model.

To train the DialKGWalker model with ground-truth reference to KG entities, the embodiments disclosed herein collected a new human-to-human multi-turn dialogs dataset (91K utterances across 15K dialog sessions) using ParlAI (Miller et al., 2017), where conversation participants play a role either as a user or as an assistant, while annotating their mention of an entity in a large-scale common fact KG. This new dataset provides a new way for researchers to study how conversational topics could jump across many different entities within multi-turn dialogs, grounded on KG paths that thread all of them. To the best of our knowledge, OpenDialKG may be the first parallel Dialog ↔ KG corpus where each mention of a KG entity and its factual connection in an open-ended dialog is fully annotated, allowing for in-depth study of symbolic reasoning and natural language conversations. The newly collected large-scale human-to-human multi-turn dialogs dataset where each mention of an entity in dialog is linked with its corresponding ground-truth knowledge graph path may be an effective solution for addressing the technical challenge of training a robust conversational reasoning model, because the dataset provides information as how conversational topics could jump across many different entities within multi-turn dialogs to train the conversational reasoning model.

Note that the approaches in the embodiments disclosed herein are distinct from the previous work on dialog systems in that the embodiments disclosed herein may completely ground dialogs in a large-scale common-fact KG, allowing for domain-agnostic conversational reasoning in open-ended conversations across various domains and tasks (e.g. chit-chat, recommendations, etc.) The embodiments disclosed herein therefore performed extensive cross-domain and transfer learning evaluations to demonstrate its flexibility.

The contributions may be as follows: the embodiments disclosed herein propose (1) a novel attention-based graph decoder that walks an optimal path within a large commonsense KG (100K entities, 1.1M facts) to effectively prune unlikely candidate entities, and (2) a zero-shot learning model that leverages previous sentence, dialog, and KG contexts to re-rank candidates from pruned decoder graph output based on their relevance and path scores, which allows for generalizable and robust classification with a large number of candidate classes. The embodiments disclosed herein present (3) a new parallel open-ended Dialog ↔ KG corpus called OpenDialKG where each mention of an entity in dialog is manually linked with its corresponding ground-truth KG path. The embodiments disclosed herein show that the proposed approaches outperform baselines in both in-domain and cross-domain evaluation, demonstrating that the model learns domain-agnostic walking patterns that are generalizable for unseen domains.

Method

Figure 5:
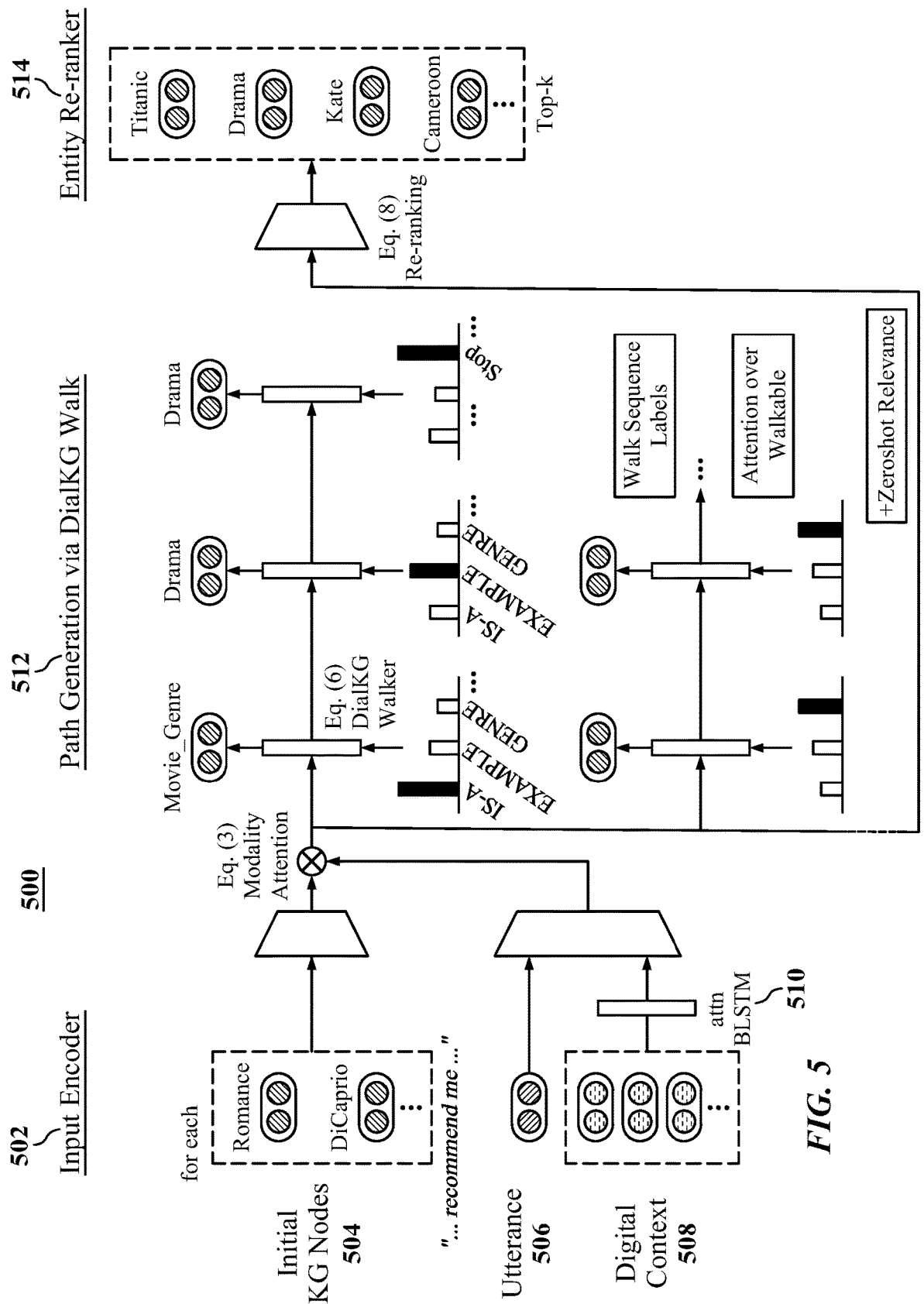
FIG. 5 illustrates an example architecture of a natural knowledge path learning model.

FIG. 5 illustrates an example architecture 500 of a natural knowledge path learning model. FIG. 5 illustrates the overall architecture 500 of the DialKG Walker model which retrieves a set of entities from a provided KG given multiple modalities of dialog contexts. $X=\{X_e; X_s; X_d\}$ is encoded with the input encoder (left) 502, aggregated via multiple attention mechanism. The decoder (right) predicts both the optimal paths and the final entities $Y=\{Y_e; Y_r\}$ based on their zero-shot relevance scores as well as soft-attention based walk paths, which prunes unlikely entities. Specifically, for each turn the model takes as input a set of KG entities mentioned at its current turn (i.e., initial KG nodes 504), a full sentence at the current turn (i.e., utterance 506), and all sentences from previous turns of dialog (i.e., dialog context 508), which are encoded using Bi-LSTMs with self-attention modules 510. In the component of path generation via DialKG walk 512, the autoregressive graph decoder takes attention-based encoder output at each decoding step to generate a walk path for each starting KG entity, which is combined with zero-shot KG embeddings prediction results to rank candidate entities. After that an entity re-ranker 514 may re-rank the candidate entities, based on which a response may be generated. As a result, the conversational reasoning model may have a technical advantage of generating more natural and human-like responses as the conversational reasoning model is based on knowledge graph and input contexts including dialog sates, sentence, and initial entities mentioned in the conversation.

i Notations

The embodiments disclosed herein define the knowledge graph $G_{KG}=V_{KG} \times R_{KG}$ which is composed of all common-sense entity nodes $V_{KG}$ and the relation set $R_{KG}$ that connects each pair of two nodes. Let us also denote $V_r(v)$ to be a set of nodes directly connected to a node $v \in V_{KG}$ by a relation $r \in V_{KG}$. Similarly, the embodiments disclosed herein denote $V_{Rn}(v)$ to be a set of nodes connected to v via n-hops with a set of relations R.

Each input is composed of three modalities: $X=\{X_e; X_s; X_d\}$, where $X_e=\{X_e^{(i)}\}$ is a set of entities mentioned in the current turn, $X_s$ is its surrounding sentence context in the same turn, and $X_d$ is its dialog context up to the previous turn.

Each output is a KG path sequence that connects x with entities mentioned in the next turn, which is represented in two modalities: $Y=\{Y_e; Y_r\}$, where $Y_e=\{Y_e^{(i)}\}$ is a set of entity paths, where each entity path with length T is defined as $y_e^{(i)}=\{y_{e,t}^{(i)}\}_{t=1}^T$. Similarly, $y_r=\{y_r\}$ is a set of relation paths, each with length T that connects $x_e^{(i)}$ and $y_e^{(i)}$ via relations in $R_{KG}$.

The embodiments disclosed herein formulate the future entity retrieval task as:

$$y = \text{argmax score } (f_{x \to y}(x), y')$$

$$y_e' \subset V(x_e$$

where $f_{x \to y}$ is a function with learnable parameters that projects input samples at the current turn (x) into the same space as the output representations (y), i.e. entities to be mentioned in the next turn and their optimal paths. $V(x_e) \subset V_{KG}$ denotes a set of KG entity nodes reachable from $x_e$, defined accordingly to each decoding method.

ii Input Encoding

Entity representation: In particular embodiments, selecting the one or more candidate nodes may comprise generating an entity representation for the one or more initial entities associated with the query. Generating the entity representation may be based on a neural network model. As an example and not by way of limitation, the embodiments disclosed herein construct KG embed-dings to encode each entity mention (Bordes et al., 2013), in which semantically similar entities are distributed closer in the embeddings space. In brief formulation, the model for obtaining embeddings from a KG (composed of subject-relation-object (s, r, o) triples) is as follows:

$$P(\mathbb{I}_r(s,o)=1|\theta=\text{score}(e(s),e_r(r),e(o)) \tag{1}$$

where $\mathbb{I}_r$ is an indicator function of a known relation r for two entities (s,o) (1: valid relation, 0: unknown relation), e is a function that extracts embeddings for entities, $e_r$ extracts embeddings for relations, and score(.) is a deep neural network that produces a likelihood of a valid triple.

Sentence representation: In particular embodiments, selecting the one or more candidate nodes may comprise generating a sentence representation for the context associated with the query. Generating the sentence representation may be based on a long-short term memory (LSTM) model. As an example and not by way of limitation, the embodiments disclosed herein represent textual context of surrounding words of a mention with a state-of-the-art attention-based Bi-LSTM language model (Conneau et al., 2017) with GloVe (Pennington et al., 2014) distributed word embed-dings trained on the Wikipedia and the Gigaword corpus with a total of 6B tokens.

Dialog representation: In particular embodiments, selecting the one or more candidate nodes may comprise generating a dialog representation for the one or more dialog states associated with the query. Generating the dialog representation may be based on a long-short term memory (LSTM) model. As an example and not by way of limitation, to encode previous dialog history, the embodiments disclosed herein use a hierarchical Bi-LSTM (Yang et al., 2016) over a sequence of previous sentences with a fixed window size. The embodiments disclosed herein apply self-attention over sentences to attenuate and amplify sentence contexts based on their relevance to the task, allowing for more robust and explainable prediction.

Input aggregation: In particular embodiments, selecting the one or more candidate nodes may comprise generating an aggregated input based on the entity representation, the sentence representation, and the dialog representation. In particular embodiments, the query may be associated with a particular task. Each of the entity representation, sentence representation, and dialog representation may have a respective importance level with respect to the particular task. Accordingly, generating the aggregated input may be further based on the respective importance level of the entity representation, sentence representation, and dialog representation with respect to the particular task. As an example and not by way of limitation, the embodiments disclosed herein aggregate input contexts $\bar{x}$ from entities, sentences and dialogs, by applying the modality attention (Moon et al., 2018a,b), which selectively attenuates or amplifies each modality based on their importance on the task:

$$[a_e; a_s; a_d] = \sigma(W_m \cdot [xe; xs; x_d] + b_m) \tag{2}$$

$$a_m = \frac{\exp(a_m)}{\sum_{m' \in \{e,s,d\}} \exp(a_{m'})} \forall m \in \{e, s, d\}$$

$$\bar{x} = \sum_{m \in \{e,s,d\}}, a_m x_m \tag{3}$$

where $a=[a_e; a_s; a_d] \in \mathbb{R}^3$ is an attention vector, and x is a final context vector that maximizes information gain.

iii Graph Decoder

In particular embodiments, selecting the one or more candidate nodes may further comprise inputting the aggregated input to the conversational reasoning model. The conversational reasoning model may then generate one or more paths attending to a plurality of nodes within the knowledge graph. To be more specific, using the contextual information extracted from an entity and its surrounding text, the embodiments disclosed herein build a network which predicts a corresponding KG entity based on its knowledge graph embeddings with the following objective:

$$\min_W \mathcal{L}_f(x, y_e; W_f, W_p) + \mathcal{L}_{walk}(x, y_p; W_p)$$

$$R(W) : \text{regularization} \tag{4}$$

where $\mathcal{L}_f(\bullet)$ is a supervised loss for generating the correct entity at the next turn, and $\mathcal{L}_{walk}$ is a loss defined for taking the optimal path within a knowledge graph. $W=\{W_f, W_p, W_{input}\}$ are the learnable parameters for the final entity classifier ($W_f$), the path walker model ($W_p$), and the input encoder, respectively. R(W) denotes the weight decay regularization term.

In particular embodiments, the conversational reasoning model may determine a relevance between the initial entities and each of the plurality of nodes in the knowledge graph. Accordingly, selecting the one or more candidate nodes may be further based on the determined relevance of the respective candidate nodes. The embodiments disclosed herein compute zero-shot relevance score in the KG embeddings space, thus allowing for robust prediction for KG entities and domains unseen during training as well. Specifically, the embodiments disclosed herein use the supervised hinge rank loss for KG embeddings prediction as a choice of $\mathcal{L}_f$, defined for each sample (Moon and Carbonell, 2017).

$$\sum_i \sum_{y \neq y_e^{(i)}} \max[0, \bar{y} \cdot y_e^{(i)} - f(\bar{x}^{(i)}) \cdot (y_e^{(i)} - \bar{y})^T] \tag{5}$$

where f(•) is a transformation function that walks through the knowledge graph and projects a predicted future entity in the KG embeddings space, and $\bar{y}$ refers to the embeddings of negative samples randomly sampled from KG entities except the ground truth label of the instance. Intuitively, the model is trained to produce a higher dot product similarity between the projected embeddings of a sample with its correct label ($f(\bar{x}^{(i)}) \cdot y_e^{(i)}$) than with an incorrect negative label in the KG label embeddings space ($f(\bar{x}^{(i)}) \cdot \bar{y}$), where the margin is defined as the similarity between a ground truth sample and a negative sample ($\tilde{y}$, $y_e^{(i)}$).

Generating candidate KG entities solely based on their relevance score (Eq.5) is challenging due to the exponentially large search space. To this end, the embodiments disclosed herein define the attention-based DialKG graph decoder model which prunes unattended paths, which effectively reduce the search space. Decoding steps are formulated as follows (bias terms for gates are omitted for simplicity of notation):

$$i_t = o(W_{hi}h_{t-1} + W_{ci}c_{t-1})$$

$$c_t = (1-i_t)\odot c_{t-1} + i_t \odot \tanh(W_{zc}z_t + W_{hc}h_{t-1})$$

$$o_t = o(W_{zo}z_t + W_{ho}h_{t-1} + W_{co}c_t)$$

$$h_t = \text{WALK}(\tilde{x}, z_t) = o_t \tanh \odot (c_t) \quad (6)$$

where $z_t$ is a context vector at decoding step t, produced from the attention over walkable path which is defined as follows:

$$a_t = o(W_{ha}h_{t-1} + W_{xa}\bar{x}_t) \quad (7)$$

$$z_t = h_{t-1} + \sum_{r_k \in R_{KG}} a_{t,k}r_k$$

where $a_t \in \mathbb{R}^{|R_{KG}|}$ is an attention vector over the relations space, $r_k$ is relation embeddings, and $z_t$ is a resulting entity context vector after walking from its previous entity on an attended path.

The embodiments disclosed herein guide the graph decoder with the ground-truth walk paths by computing the following loss $\mathcal{L}_{walk}(x,y) = \Sigma_{i,t}\mathcal{L}_{ent} + \mathcal{L}_{rel}$ between predicted paths and each of $\{y_e, y_r\}$, respectively ($L_{ent}$: loss for entity paths, and $L_{ent}$ for relation paths):

$$\sum_{y_e \neq y_{e,t}^{(i)}} \max\left[0, \tilde{y}_e \cdot \tilde{y}_{e,t}^{(i)} - h_t^{(i)} \cdot (y_{e,t}^{(i)} - \tilde{y}_e)^T\right] +$$

$$\sum_{y_r \neq y_{r,t}^{(i)}} \max\left[0, \tilde{y}_r \cdot y_{r,t}^{(i)} - a_t r \cdot (y_{r,t}^{(i)} - \tilde{y}_r)^T\right]$$

As a result, the conversational reasoning model may have a technical advantage of providing a natural way to explain how and why a response is generated because the walk paths on the knowledge graph are easy to interpret.

In particular embodiments, the conversational reasoning model may determine, for each of the one or more paths, a relevance with respect to the initial entities. The conversational reasoning model may rank the one or more paths based on their respective relevance with respect to the initial entities. The conversational reasoning model may further select the top ranked path, wherein the top ranked path attends to the one or more candidate nodes. In other words, once the model is trained, at each decoding step, the embodiments disclosed herein may rank the potential paths based on the sum of their zero-shot relevance (left) and soft-attention-based output path (right) scores:

$$y_{e,t}^{(i)} = \text{argmax } h_t \cdot y_e^{(i)T} + \Sigma a_{t,k} r_k y_r^{(i)T} \quad (8)$$

Adversarial Transfer Learning: if domain labels (yd) are available (e.g. movie, book, sports, etc.), the embodiments disclosed herein can utilize these labels to further aid training by extracting transferrable features and learning optimal paths conditioned on domain embeddings (Ganin et al., 2016). The embodiments disclosed herein implement adversarial transfer learning for DialKG Walker as follows and study this specific setting in one of our experiments to demonstrate that the model can better generalize over multiple domains:

$$\mathcal{L} = \mathcal{L}_f + \mathcal{L}_{walk} + \text{Entropy}(\sigma(W_d x), y_d)$$

$$h_t = \text{WALK}([\underline{x}; W_d x)], z_t) \quad (9)$$

Dataset: OpenDialKG

To empirically evaluate the proposed approach, the embodiments disclosed herein collected a new dataset, OpenDialKG, of chat conversations between two agents engaging in a dialog about a given topic (91K turns across 15K dialog sessions). Each dialog is paired with its corresponding "KG paths" that weave together the KG entities and relations that are mentioned in the dialog. This parallel corpus of textual dialogs and corresponding KG walks enables learning models that ground the implicit reasoning in human conversations to discrete KG operations.

Wizard-of-Oz setup: The dialogs were generated in a Wizard-of-Oz setting (Shah et al., 2018) by connecting two crowd-workers to engage in a chat session, with the joint goal of creating natural and engaging dialogs. The first agent is given a seed entity and asked to initiate a conversation about that entity. The second agent is provided with a list of facts relevant to that entity and asked to choose the most natural and relevant facts and use them to frame a free-form conversational response. Each fact is a 1-hop or 2-hop path initiating from the conversation topic. After the second agent sends their response, various new multi-hop facts from KG are surfaced to include paths initiating from new entities introduced in the latest message. This process allows the conversation participants to annotate any new fact or entity they want to introduce at each turn, along with the ground-truth KG walk path that connect the two KG entities. At this point the first agent is instructed to continue the conversation by choosing among the updated set of facts and framing a new message. This cycle continues for 6 messages per session on average spanning multiple KG paths, until one of the agents decides to end the conversation (e.g. the task goal is met).

The embodiments disclosed herein did two separate collections: a recommendation task where the second agent acts as an assistant who is providing useful recommendations to the user, and a chit-chat task where both agents act as users engaging in open-ended chat about a particular topic. To ensure sufficient separation of the dialog content, the embodiments disclosed herein used entities related to movies (titles, actors, directors) and books (titles, authors) for the recommendation task, and entities related to sports (athletes, teams) and music (singers) for the chit-chat task (Table 1). Seed entities for each domain are crawled from various public resources (e.g. IMDB top movies list, top athletes list, etc.) and linked with the corresponding KG entities.

TABLE 1

Task/domain distribution of OpenDialKG.

| Task: | Recommendation | | Chit-chat | | |
|---|---|---|---|---|---|
| Domain: | Movies | Books | Sports | Music | All |
| # of dialogs | 6,429 | 5,891 | 2,495 | 858 | 15,673 |
| # of turns | 37,838 | 34,035 | 14,344 | 4,992 | 91,209 |

KG sources: The embodiments disclosed herein use the Freebase (Bast et al., 2014) KG which is a publicly available and comprehensive source of general-knowledge facts. To reduce noise, the embodiments disclosed herein filter tail-end entities based on their prominence scores, the resulting KG of which consists of total 1,190,658 fact triples over top 100,813 entities and 1,358 relations. The embodiments disclosed herein randomly split the dialog sessions into train (70%), validation (15%), and test sets (15%).

Empirical Evaluation

Task: Given a set of KG entity mentions from current turn, and dialog history of all current and previous sentences, the goal is to build a robust model that can retrieve a set of natural entities to mention from a large-scale KG that resemble human responses. Note that end-to-end generation of sentences (e.g. based on the retrieved entities) is not part of this study —instead, the embodiments disclosed herein focus on the important challenge of scaling the conversational reasoning and knowledge retrieval task to open-domain dialogs, requiring an aggressive subset selection (from 1M+ facts subset of Freebase).

i Baselines

The embodiments disclosed herein choose as baselines the following state-of-the-art approaches that augment external knowledge to dialog systems for various tasks, and modify accordingly to fit to our entity retrieval task (e.g. the embodiments disclosed herein use the same 1M-facts FreeBase KG for all of the baselines):

seq2seq (Sutskever et al., 2014) with dialog contexts+ zero-shot: the embodiments disclosed herein apply the seq2seq approach for entity path generation, given all of the dialog contexts. To make this baseline stronger, the embodiments disclosed herein add a zero-shot learning layer in the KG embeddings space (replacing typical softmax layers to improve generality) for entity token decoding.

Tri-LSTM (Young et al., 2018): encodes each utterance and all of its related facts within 1-hop from a KG to retrieve a response from a small (N=10) pre-defined sentence bank. The embodiments disclosed herein modify the retrieval bank to be the facts from the KG instead.

Extended Enc-Dec (Parthasarathi and Pineau, 2018): conditions response generation with external knowledge vector input. A response entity token is generated at its final softmax layer, hence not utilizing structural information from KG.

The embodiments disclosed herein also consider several configurations of the proposed approach to examine contributions of each component (input modalities (E): entities, (S): sentence, (D): dialog contexts).

(Proposed; E+S+D): is the proposed approach as described in FIG. 5.

(E+S): relies only on its previous sentence and excludes dialog history from input.

(E): only uses starting KG entities as input contexts, and excludes any textual context.

ii Results

Parameters: The embodiments disclosed herein tune the parameters of each model with the following search space (bold indicate the choice for our final model): KG embeddings size: f64, 128, 256, 512 g, LSTM hidden states: f64, 128, 256, 512 g, word embeddings size: f100, 200, 300 g, max dialog window size: f2, 3, 4, 5 g. The embodiments disclosed herein optimize the parameters with Adagrad (Duchi et al., 2011) with batch size 10, learning rate 0.01, epsilon $10^{-8}$, and decay 0.1.

In-domain evaluation: Table 2 shows the generation results of the top-k predictions of the model for in-domain train and test pairs (train & test on: all domains/train & test on: movie domain split). It can be seen that the proposed DialKG Walker model outperforms other state-of-the-art baselines, especially for recalls at small ks. Specifically, when textual contexts are added as input (E+S and E+S+D), the model learns to condition its walk path output on textual contexts, thus outperforming the non-textual ablation model (E). seq2seq and Tri-LSTM models consider the nodes connected via all possible relations as candidates in the final layer (without pruning), resulting in extensive search space and consequently poor recall performance. In addition, Tri-LSTM only considers the facts connected via 1-hop relations as input contexts, which limits its prediction for multi-hop facts. Ext-ED relies its prediction in the final softmax layer, which typically performs poorly for a large number of output class, compared to zeroshot learning approaches.

TABLE 2

In-domain (train/test on the same domain) response generation performance on the OpenDialKG dataset (metric: recall@k). Our proposed model is compared against state-of-the-art models as well as several ablation variations of the proposed model. All of the 100K+ KG entities are considered initial candidates for generation (before masking).

| Input | Model | All Domains → All | | | | | Movie → Movie | | | | |
|---|---|---|---|---|---|---|---|---|---|---|---|
| | | r@1 | 3 | 5 | 10 | 25 | r@1 | 3 | 5 | 10 | 25 |
| E + S + D | seq2seq (Sutskever et al., 2014) | 3.1 | 18.3 | 29.7 | 44.1 | 60.2 | 3.0 | 13.4 | 23.4 | 38.5 | 55.5 |
| E + S | Tri-LSTM (Young et al., 2018) | 3.2 | 14.2 | 22.6 | 36.3 | 56.2 | 1.5 | 10.3 | 17.4 | 30.7 | 51.1 |
| E + S | Ext-ED (Parthasarathi and Pineau, 2018) | 1.9 | 5.8 | 9.0 | 13.3 | 19.0 | 1.3 | 5.4 | 7.8 | 11.8 | 15.8 |
| E | DialKG Walker (ablation) | 10.7 | 22.9 | 32.0 | 44.9 | 57.4 | 5.3 | 13.5 | 18.5 | 25.2 | 39.1 |
| E + S | DialKG Walker (ablation) | 11.3 | 23.3 | 31.0 | 44.0 | 60.5 | 7.2 | 19.2 | 27.9 | 40.7 | 58.7 |
| E + S + D | DialKG Walker (proposed) | 13.2 | 26.1 | 35.3 | 47.9 | 62.2 | 7.8 | 20.0 | 27.9 | 40.4 | 58.6 |

E: entities,

S: sentence,

D: dialog contexts.

TABLE 3

Cross-domain (train/test on the different domain) response generation performance on the OpenDialKG dataset (metric: recall@k).

| | | Movie → Book | | | | | Movie → Music | | | | |
|---|---|---|---|---|---|---|---|---|---|---|---|
| Input | Model | r@1 | 3 | 5 | 10 | 25 | r@1 | 3 | 5 | 10 | 25 |
| E + S + D | seq2seq (Sutskever et al., 2014) | 2.9 | 21.3 | 35.1 | 50.6 | 64.2 | 1.5 | 12.1 | 19.7 | 34.9 | 49.4 |
| E + S | Tri-LSTM (Young at al., 2018) | 2.3 | 17.9 | 29.7 | 44.9 | 61.0 | 1.9 | 8.7 | 12.9 | 25.8 | 44.4 |
| E + S | Ext-ED (Parthasarathi and Pineau, 2018) | 2.0 | 7.9 | 11.2 | 16.4 | 22.4 | 1.3 | 2.6 | 3.8 | 4.1 | 8.3 |
| E | DialKG Walker (ablation) | 8.2 | 15.7 | 22.8 | 31.8 | 48.9 | 4.5 | 16.7 | 21.6 | 25.8 | 33.0 |
| E + S | DialKG Walker (ablation) | 12.6 | 28.6 | 38.6 | 54.1 | 65.6 | 6.0 | 15.9 | 22.8 | 33.0 | 47.5 |
| E + S + D | DialKG Walker (proposed) | 13.5 | 28.8 | 39.5 | 52.6 | 64.8 | 5.3 | 13.3 | 19.7 | 28.8 | 38.0 |

E: entities,
S: sentence,
D: dialog contexts.

Cross-domain evaluation: Table 3 demonstrates that the DialKG Walker model can generalize to multiple domains better than the baseline approaches (train: movie & test: book/train: movie & test: music). This result indicates that our method may also allow for zero-shot pruning by relations based on their proximity in the KG embeddings space, thus effective in cross-domain cases as well. For example, relations 'scenario by' and 'author' are close neighbors in the KG embeddings space, thus allowing for zero-shot prediction in cross-domain tests, although their training examples usually appear in two separate domains: movie and book.

TABLE 4

Error analysis: DialKG Walker with attention (ours) vs. baselines.
Ground-truth response (GT) and model predictions of walk paths and future entities for the underlined entity mentions are shown. Dialogs are only partially shown due to space constraints.

| | | Response | |
|---|---|---|---|
| Input Dialog (start entity) | Model | Walk Path | Predicted Entity |
| A: Yes, I believe he [Muller] has played in Munich. | GT | award won by → position | Forward |
| B: He also won Bravo Award, I think that's awesome! | KG_Walker | award won by | Lionel Messi |
| A: [response] | Ext-ED | award won by | Muller |
| A: Could you recommend a book by Mark Overstall? | GT | wrote → has genre | Romance |
| B: [response] | KG_Walker | wrote → has genre | Romance |
| | Ext-ED | language | English |
| A: Do you like Lauren Oliver I think her books are great! | GT | written by → wrote | Requiem |
| B: I do, Vanishing Girls is one of my fivorile books. | KG_Walker | written by → wrote | Annabel |
| A: [response] | Tri-LSTM | released year | 2015 |
| A: What about the Oakland Raiders? | GT | Champion | Packers |
| B: Oh yes, I do like them. I've been a fan since they were runner-up in Super Bowl II. What about you? // A: [response] | KG_Walker | Champion | Packers |
| | seq2seq | Runner-up → Is_A | NFL Team |
| A: Do you like David Guetta? I enjoy his music. | GT | composer → composed | Club Can't Handle Me |
| B: Oh, I love his lyrics to Love is Gone and the song Wild Ones.What are your favorites? // A: [response] | KG_Walker | composer → composed | I Love It |
| | Tri-LSTM | composer | David Guetta |

Human evaluation: To compare the subjective quality of the models, i.e. the relative naturalness and relevance of the generated KG paths, the embodiments disclosed herein performed a human evaluation where paid raters were shown partial dialogs taken from the test dataset, along with the top 2 paths output from each model. The rater was asked to choose the 3 most appropriate paths for continuing the dialog. The embodiments disclosed herein evaluated 250 dialogs, showing each dialog to 3 raters, for a total 750 tasks. The embodiments disclosed herein report the % of cases when a top-k chosen fact was generated by each of the models (Table 5). The numbers add up to more than 100% as models can generate identical paths. If such a path is chosen by the rater, it is counted towards each of the models that generated the path.

TABLE 5

Human evaluation: "Which response is the most natural for given dialog context?" (metric: % of cases chosen as top-k response by the raters).

| | % in top-k | | |
|---|---|---|---|
| | k = 1 | k = 2 | k = 3 |
| (Parthasarathi and Pineau, 2018) | 17.5 | 33.6 | 47.2 |
| (Young et al., 2018) | 30.8 | 50.1 | 70.3 |

TABLE 5-continued

Human evaluation: "Which response is the most natural for given dialog context?" (metric: % of cases chosen as top-k response by the raters).

| | % in top-k | | |
|---|---|---|---|
| | k = 1 | k = 2 | k = 3 |
| (Sutskever et al., 2014) | 31.5 | 57.7 | 73.1 |
| KG Walker (proposed) | 38.6 | 61.8 | 76.3 |

The embodiments disclosed herein show that the generated responses by our proposed methods achieve the highest scores in all top-k evaluation, validating that the model can output more natural human-like responses.

Figure 6B:
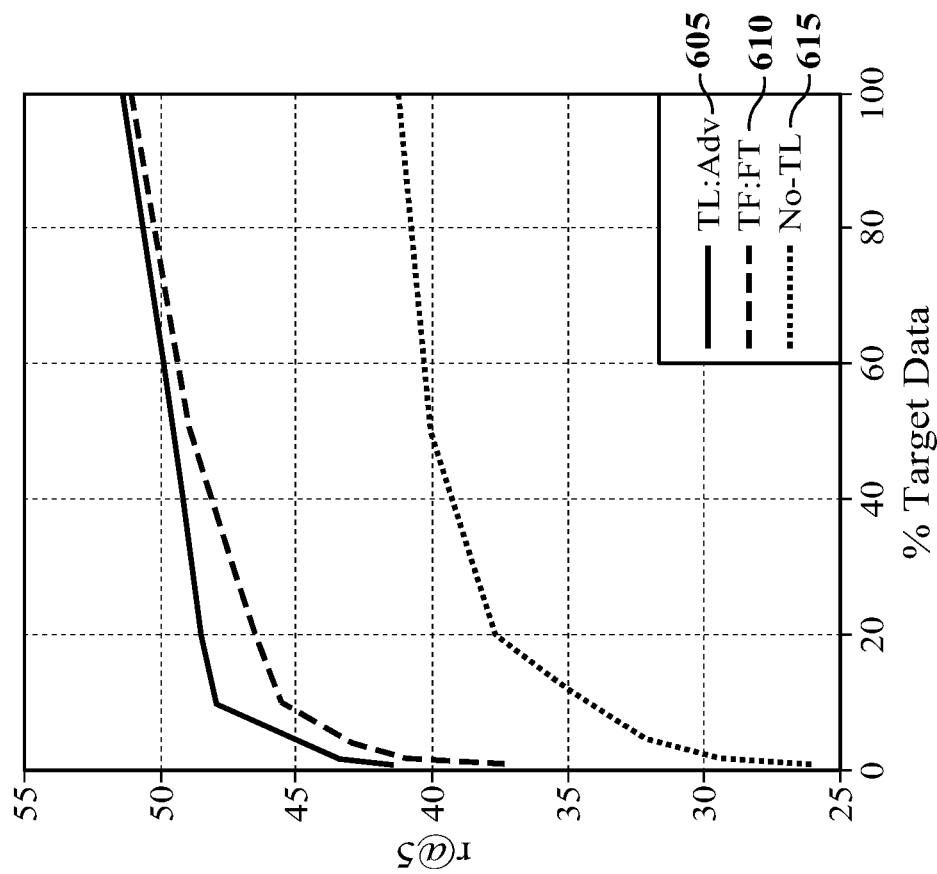
FIG. 6B illustrates example transfer learning results of the natural knowledge path learning model on target data of Sports domain.
Figure 6A:
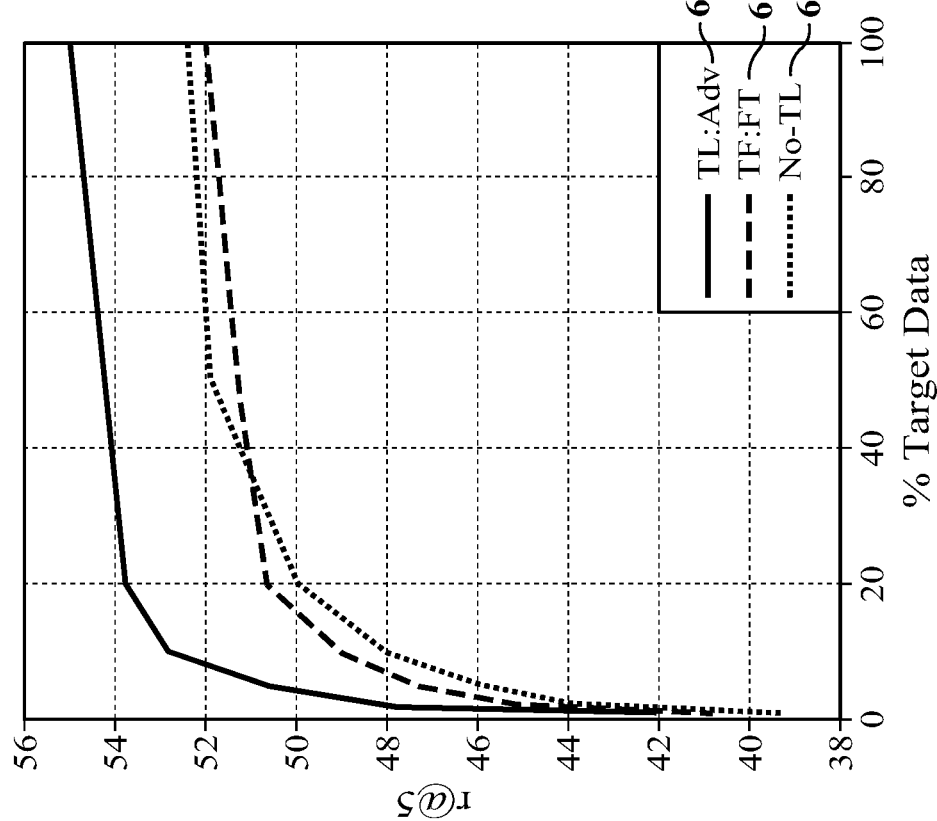
FIG. 6A illustrates example transfer learning results of the natural knowledge path learning model on target data of Book domain.

Transfer learning: FIGS. 6A-6B illustrate example transfer learning results of the natural knowledge path learning model. FIG. 6A illustrates example transfer learning results of the natural knowledge path learning model on target data of Book domain. FIG. 6B illustrates example transfer learning results of the natural knowledge path learning model on target data of Sports domain. The results are based on r@5 of DialKG Walker at varying availability of target data with (a) Book and (b) Sports domains as a Target (Source: Movie). (TL:Adv) 605 indicates data transfer with adversarial discriminator for source and target domains. (TL:FT) 610 indicates model transfer with fine-tuning. (No-TL) 615 indicates target only. In FIGS. 6A-6B, the embodiments disclosed herein show that cross-domain performance can greatly improve with a relatively small addition of in-domain target data, via the transfer learning approaches. Specifically, it can be seen that (TL:Adv) 605, which simultaneously trains for both source and target data (effectively doubling the training size) with additional adversarial discriminator for source and target domains, achieves the best performance especially for domains that are semantically close (e.g. movie and book). (TL:FT) 610 transfers knowledge from a pre-trained source model via finetuning (hence requiring significantly less training resources), and effectively avoids "cold start" training (Moon et al., 2015). This result shows that the DialKG model can quickly adapt to other new low-resource domains and improve upon the zeroshot cross-domain performance, demonstrating its potential capability to reason on open-ended conversations.

Error analysis: Table 4 shows some of the example output from each model (as well as ground-truth responses), given dialog contexts. In general, the DialKG Walker tends to explore more multi-hop relations than other baselines in order to generate natural and engaging entities, which consequently improves the diversity of answers. Note that if the graph decoder arrives at a sufficiently good entity to generate, it stops its traversal operation and outputs the most viable entity based on the relevance score. Some of the models do not take into account the dialog history, hence generating redundant topics from previous turns. There are some cases where the final entity prediction is different from the ground-truth, whereas its relation path is correctly predicted. The generated entities are often still considered valid and natural, because the proposed model uses zero-shot relevance score to best predict the candidates.

Discussion and Related Work

Knowledge augmented dialog systems: Young et al. (2018) propose to explicitly augment input text with concepts expanded via 1-hop relations (where KG triples are represented in the sentence embeddings space), and He et al. (2017) propose a system which iteratively updates KG embeddings and attends over connected entities for response generation. However, several challenges remain to scale the simulated knowledge graph used in the study to our open-ended and largescale KG with 1M+ facts. Other line of work (Parthasarathi and Pineau, 2018; Ghazvininejad et al., 2018; Long et al., 2017) uses embedding vectors obtained from external knowledge sources (e.g. NELL (Carlson et al., 2010), Freebase (Bast et al., 2014), free-form text, etc.) as an auxiliary input to the model in dialog generation. Our model extends the previous work by (1) explicitly modeling output reasoning paths in a structured KG, (2) by introducing an attention-based multi-hop concept decoder to improve both recall and precision. End-to-end dialog systems: Several models and corresponding datasets have recently been published. Most work focuses on task or goal oriented dialog systems such as conversational recommendations (Salem et al., 2014; Bordes et al., 2017; Sun and Zhang, 2018; Dalton, 2018), information querying (Williams et al., 2017; de Vries et al., 2018; Reddy et al., 2018), etc., with datasets collected mostly through bootstrapped simulations (Bordes et al., 2017), Wizard-of-Oz setup (Zhang et al., 2018; Wei et al., 2018), or online corpus (Li et al., 2016). Our OpenDialKG corpus may be unique in that it includes open-ended natural human conversations over multiple scenarios (e.g. chit-chat and recommendation on various domains), where reasoning paths from each dialog are annotated with their corresponding discrete KG operations. The embodiments disclosed herein can also be viewed as extending the conventional state-tracking approaches (Henderson et al., 2014) to more flexible KG path as states.

KG embeddings and inference: Several methods have been proposed for KG inference tasks (e.g. edge prediction), which include neural models trained to discern positive and negative triples (Bordes et al., 2013; Wang et al., 2014; Nickel et al., 2016; Dettmers et al., 2018), or algorithms with discrete KG operations on structured data (Lao et al., 2011; Chen et al., 2015). KG embeddings have been shown effective in other NLP tasks when they are used as target labels for classification tasks, which also allows for effective transfer learning (Moon and Carbonell, 2017). For effective application of KG embeddings in NLP tasks, recent studies (Kartsaklis et al., 2018) proposed to map word embeddings and KG embeddings via end-to-end tasks. In contrast to the line of work on KG edge prediction, we aim to learn an optimal path within existing paths that resemble human reasoning in conversations.

Conclusions

The embodiments disclosed herein study conversational reasoning grounded on knowledge graphs and formulate an approach in which the model learns to navigate a largescale, open-ended KG given conversational contexts. For this study, the embodiments disclosed herein collected a newly annotated Dialog↔KG parallel corpus of 15K human-to-human dialogs which includes ground-truth annotation of each dialog turn to its reasoning reference in a large-scale common fact KG. The proposed DialKG Walker model improves upon the state-of-the-art knowledge-augmented conversation models by 1) a novel attention-based graph decoder that penalizes decoding of unnatural paths which effectively prunes candidate entities and paths from a large search space (1.1M facts), 2) a zero-shot learning model that predicts its relevance score in the KG embeddings space, combined score of which is used for candidate ranking. The empirical results from in-domain, cross-domain, and transfer learning evaluation demonstrate the efficacy of the proposed model in domain-agnostic conversational reasoning.

Figure 7:
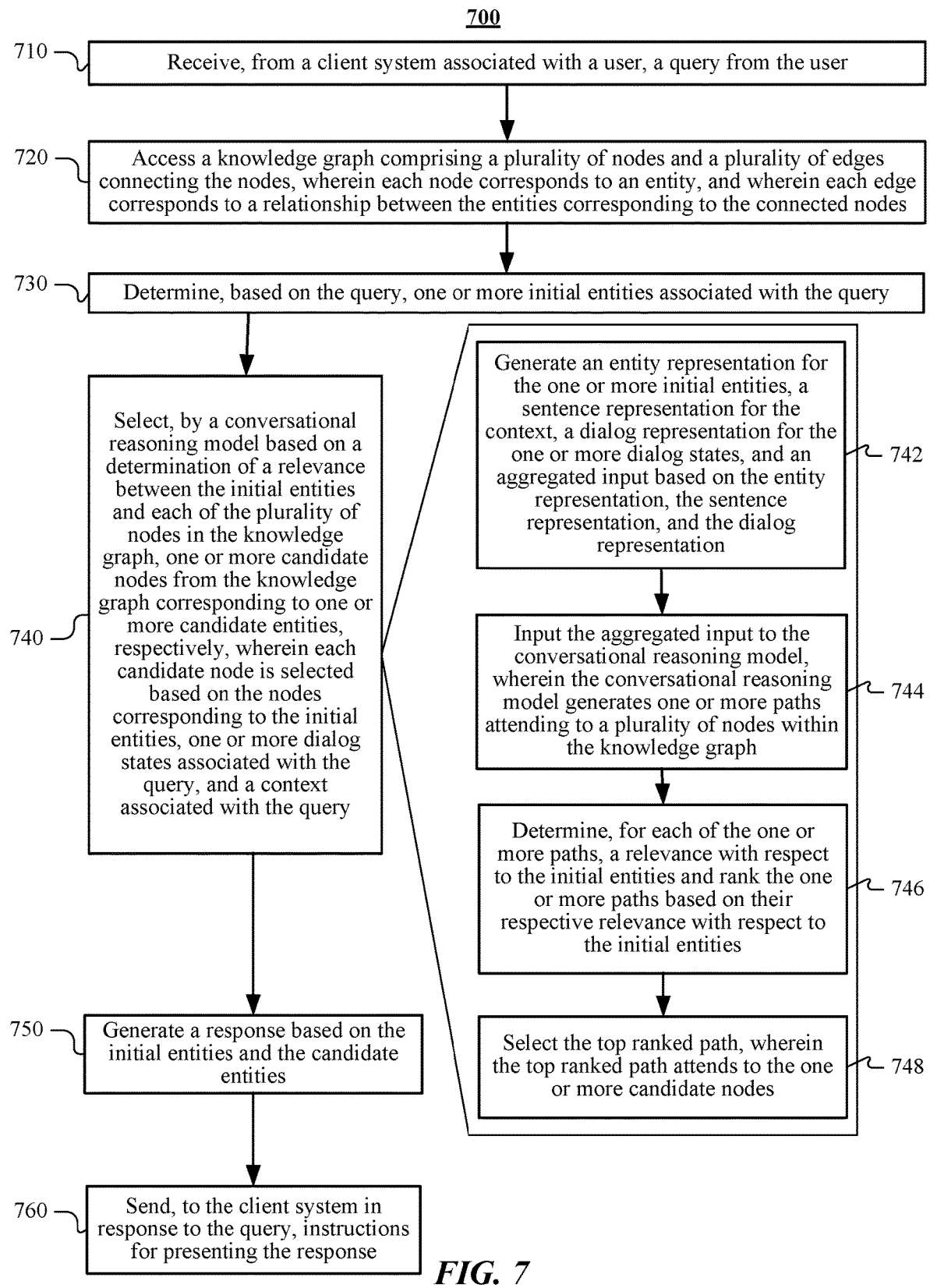
FIG. 7 illustrates an example method for conversational reasoning based on a knowledge graph.

FIG. 7 illustrates an example method 700 for conversational reasoning based on a knowledge graph. The method may begin at step 710, where the assistant system 140 may receive, from a client system 130 associated with a user, a query from the user. At step 720, the assistant system 140 may access a knowledge graph comprising a plurality of nodes and a plurality of edges connecting the nodes, wherein each node corresponds to an entity, and wherein each edge corresponds to a relationship between the entities corresponding to the connected nodes. At step 730, the assistant system 140 may determine, based on the query, one or more initial entities associated with the query. At step 740, the assistant system 140 may select, by a conversational reasoning model based on a determination of a relevance between the initial entities and each of the plurality of nodes in the knowledge graph, one or more candidate nodes from the knowledge graph corresponding to one or more candidate entities, respectively. Each candidate node may be selected based on the nodes corresponding to the initial entities, one or more dialog states associated with the query, and a context associated with the query. Step 740 may comprise the following sub-steps: At sub-step 742, the assistant system 140 may generate an entity representation for the one or more initial entities, a sentence representation for the context, a dialog representation for the one or more dialog states, and an aggregated input based on the entity representation, the sentence representation, and the dialog representation. At sub-step 744, the assistant system 140 may input the aggregated input to the conversational reasoning model, wherein the conversational reasoning model generates one or more paths attending to a plurality of nodes within the knowledge graph. At sub-step 746, the assistant system 140 may determine, for each of the one or more paths, a relevance with respect to the initial entities and rank the one or more paths based on their respective relevance with respect to the initial entities. At sub-step 748, the assistant system 140 may select the top ranked path, wherein the top ranked path attends to the one or more candidate nodes. At step 750, the assistant system 140 may generate a response based on the initial entities and the candidate entities. At step 760, the assistant system 140 may send, to the client system 130 in response to the query, instructions for presenting the response. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for conversational reasoning based on a knowledge graph including the particular steps of the method of FIG. 7, this disclosure contemplates any suitable method for conversational reasoning based on a knowledge graph including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

REFERENCES

The following list of references correspond to the citations above:

Hannah Bast, Florian Baurle, Bjorn Buchhold, and Elmar Haussmann. 2014. Easy access to the freebase dataset. In WWW.

Antoine Bordes, Y-Lan Boureau, and Jason Weston. 2017. Learning end-to-end goal-oriented dialog. ICLR.

Antoine Bordes, Nicolas Usunier, Alberto Garcia-Duran, Jason Weston, and Oksana Yakhnenko. 2013. Translating embeddings for modeling multi-relational data. In NIPS.

Andrew Carlson, Justin Betteridge, Bryan Kisiel, Burr Settles, Estevam R Hruschka, and Tom M Mitchell. 2010. Toward an architecture for never-ending language learning. In AAAI.

CY Chen, D Yu, W Wen, Y M Yang, J Zhang, M Zhou, K Jesse, A Chau, A Bhowmick, S Iyer, G Sreenivasulu, R Cheng, A Bhandare, and Z Yu. 2018. Gunrock: Building a human-like social bot by leveraging large scale real user data. In 2nd Alexa Prize.

Yun-Nung Chen, William Yang Wang, and Alexander Rudnicky. 2015. Jointly modeling inter-slot relations by random walk on knowledge graphs for unsupervised spoken language understanding. In NAACL.

Alexis Conneau, Douwe Kiela, Holger Schwenk, Loic Barrault, and Antoine Bordes. 2017. Supervised learning of universal sentence representations from natural language inference data. In EMNLP.

Jeff Dalton. 2018. Vote goat: Conversational movie recommendation. SIGIR.

Tim Dettmers, Pasquale Minervini, Pontus Stenetorp, and Sebastian Riedel. 2018. Convolutional 2d knowledge graph embeddings. In AAAI.

John Duchi, Elad Hazan, and Yoram Singer. 2011. Adaptive subgradient methods for online learning and stochastic optimization. JMLR.

Yaroslav Ganin, Evgeniya Ustinova, Hana Ajakan, Pascal Germain, Hugo Larochelle, Franc, ois Laviolette, Mario Marchand, and Victor Lempitsky. 2016. Domain-adversarial training of neural networks. JMLR.

Marjan Ghazvininejad, Chris Brockett, Ming-Wei Chang, Bill Dolan, Jianfeng Gao, Scott Wen-tau Yih, and Michel Galley. 2018. A knowledge-grounded neural conversation model. In AAAI.

He He, Anusha Balakrishnan, Mihail Eric, and Percy Liang. 2017. Learning symmetric collaborative dialogue agents with dynamic knowledge graph embeddings. ACL.

Matthew Henderson, Blaise Thomson, and Jason D Williams. 2014. The second dialog state tracking challenge. In SIGDIAL.

Dimitri Kartsaklis, Mohammad Taher Pilehvar, and Nigel Collier. 2018. Mapping text to knowledge graph entities using multi-sense lstms. EMNLP.

Ni Lao, Tom Mitchell, and William W. Cohen. 2011. Random walk inference and learning in a large scale knowledge base. In EMNLP.

Jiwei Li, Michel Galley, Chris Brockett, Georgios P Spithourakis, Jianfeng Gao, and Bill Dolan. 2016. A persona-based neural conversation model. ACL.

Yinong Long, Jianan Wang, Zhen Xu, Zongsheng Wang, Baoxun Wang, and Zhuoran Wang. 2017. A knowledge enhanced generative conversational service agent. In NIPS DSTC6 Workshop.

A. H. Miller, W. Feng, A. Fisch, J. Lu, D. Batra, A. Bordes, D. Parikh, and J. Weston. 2017. Parlai: A dialog research software platform. EMNLP.

Seungwhan Moon and Jaime Carbonell. 2017. Completely heterogeneous transfer learning with attention: What and what not to transfer. IJCAI.

Seungwhan Moon, Suyoun Kim, and Haohan Wang. 2015. Multimodal transfer deep learning with applications in audio-visual recognition. In NIPS MMML Workshop.

Seungwhan Moon, Leonard Neves, and Vitor Carvalho. 2018a. Multimodal named entity recognition for short social media posts. NAACL.

Seungwhan Moon, Leonard Neves, and Vitor Carvalho. 2018b. Zeroshot multimodal named entity disambiguation for noisy social media posts. ACL.

Maximilian Nickel, Lorenzo Rosasco, and Tomaso Poggio. 2016. Holographic embeddings of knowledge graphs. AAAI.

Prasanna Parthasarathi and Joelle Pineau. 2018. Extending neural generative conversational model using external knowledge sources. EMNLP.

Jeffrey Pennington, Richard Socher, and Christopher D. Manning. 2014. Glove: Global vectors for word representation. In EMNLP.

Siva Reddy, Danqi Chen, and Christopher D Manning. 2018. Coqa: A conversational question answering challenge. arXiv preprint arXiv:1808.07042.

Yasser Salem, Jun Hong, and Weiru Liu. 2014. History-guided conversational recommendation. In WWW.

Pararth Shah, Dilek Hakkani-Tur, Bing Liu, and Gokhan Tur. 2018. Bootstrapping a neural conversational agent with dialogue self-play, crowdsourcing and on-line reinforcement learning. In NAACL.

Yueming Sun and Yi Zhang. 2018. Conversational recommender system. SIGIR.

Ilya Sutskever, Oriol Vinyals, and Quoc V Le. 2014. Sequence to sequence learning with neural networks. In NIPS.

Harm de Vries, Kurt Shuster, Dhruv Batra, Devi Parikh, Jason Weston, and Douwe Kiela. 2018. Talk the walk: Navigating new york city through grounded dialogue. ECCV.

Zhen Wang, Jianwen Zhang, Jianlin Feng, and Zheng Chen. 2014. Knowledge graph embedding by translating on hyperplanes. In AAAI.

Wei Wei, Quoc Le, Andrew Dai, and Jia Li. 2018. Airdialogue: An environment for goal-oriented dialogue research. In EMNLP.

Jason D Williams, Kavosh Asadi, and Geoffrey Zweig. 2017. Hybrid code networks: practical and efficient end-to-end dialog control with supervised and reinforcement learning. ACL.

Zichao Yang, Diyi Yang, Chris Dyer, Xiaodong He, Alex Smola, and Eduard Hovy. 2016. Hierarchical attention networks for document classification. In NAACL.

Tom Young, Erik Cambria, Iti Chaturvedi, Minlie Huang, Hao Zhou, and Subham Biswas. 2018. Augmenting end-to-end dialog systems with commonsense knowledge. AAAI. Saizheng Zhang, Emily Dinan, Jack Urbanek, Arthur Szlam, Douwe Kiela, and Jason Weston. 2018. Personalizing dialogue agents: I have a dog, do you have pets too? ACL.

Social Graphs

Figure 8:
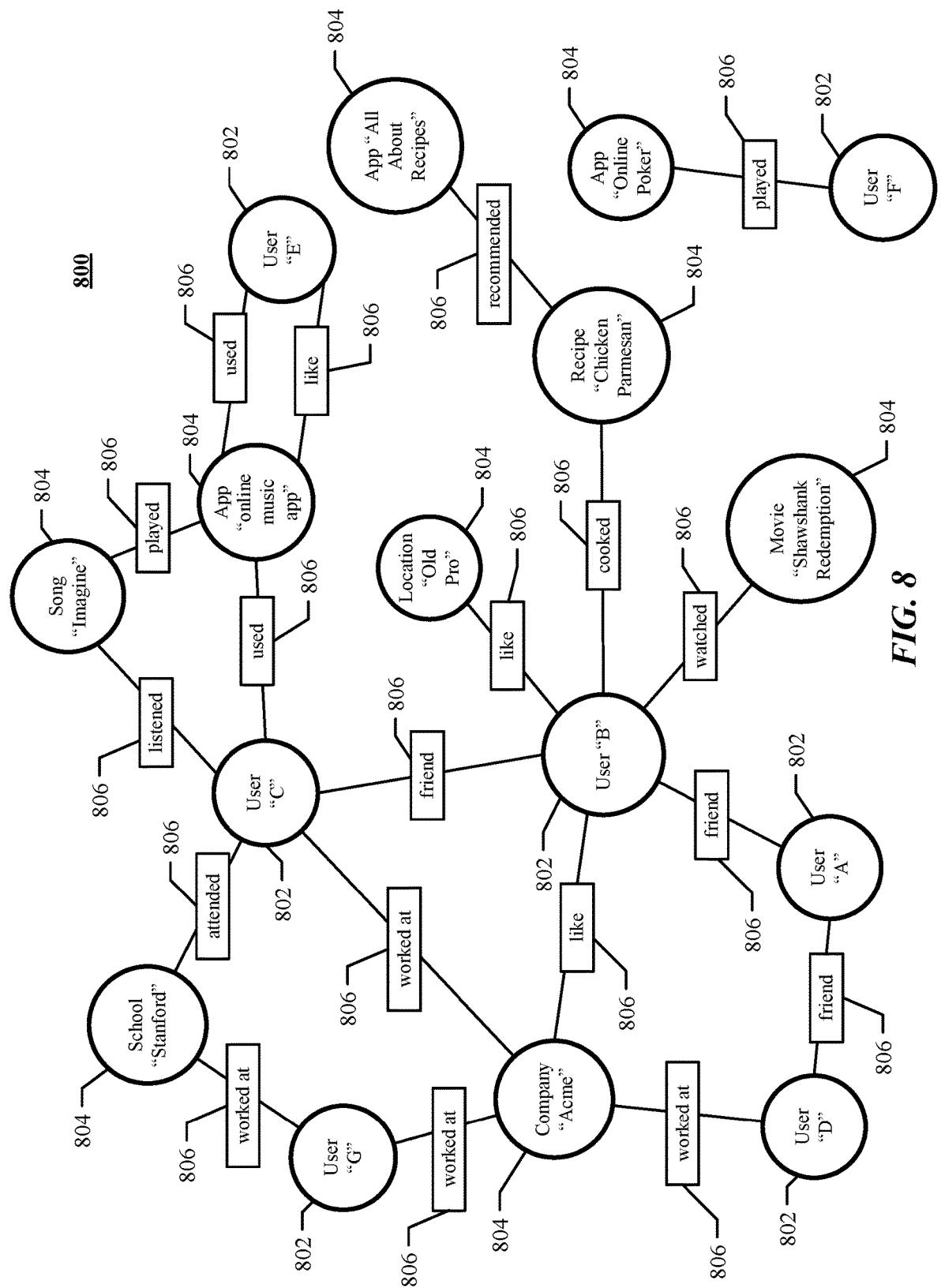
FIG. 8 illustrates an example social graph.

FIG. 8 illustrates an example social graph 800. In particular embodiments, the social-networking system 160 may store one or more social graphs 800 in one or more data stores. In particular embodiments, the social graph 800 may include multiple nodes—which may include multiple user nodes 802 or multiple concept nodes 804—and multiple edges 806 connecting the nodes. Each node may be associated with a unique entity (i.e., user or concept), each of which may have a unique identifier (ID), such as a unique number or username. The example social graph 800 illustrated in FIG. 8 is shown, for didactic purposes, in a two-dimensional visual map representation. In particular embodiments, a social-networking system 160, a client system 130, an assistant system 140, or a third-party system 170 may access the social graph 800 and related social-graph information for suitable applications. The nodes and edges of the social graph 800 may be stored as data objects, for example, in a data store (such as a social-graph database). Such a data store may include one or more searchable or queryable indexes of nodes or edges of the social graph 800.

In particular embodiments, a user node 802 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with the social-networking system 160. In particular embodiments, a user node 802 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more web interfaces.

In particular embodiments, a concept node 804 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 804 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more web interfaces.

In particular embodiments, a node in the social graph 800 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 804. Profile interfaces may be viewable by all or a selected subset of other users. As an example and not by way of limitation, a user node 802 may have a corresponding user-profile interface in which the corresponding user may add content, make declarations, or otherwise express himself or herself. As another example and not by way of limitation, a concept node 804 may have a corresponding concept-profile interface in which one or more users may add content, make declarations, or express themselves, particularly in relation to the concept corresponding to concept node 804.

In particular embodiments, a concept node 804 may represent a third-party web interface or resource hosted by a third-party system 170. The third-party web interface or resource may include, among other elements, content, a selectable or other icon, or other inter-actable object representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 802 corresponding to the user and a concept node 804 corresponding to the third-party web interface or resource and store edge 806 in one or more data stores.

In particular embodiments, a pair of nodes in the social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 806 connecting the first user's user node 802 to the second user's user node 802 in the social graph 800 and store edge 806 as social-graph information in one or more of data stores 164. In the example of FIG. 8, the social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 800 by one or more edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile interface corresponding to a concept node 804 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (a third-party online music application). In this case, the social-networking system 160 may create a "listened" edge 806 and a "used" edge (as illustrated in FIG. 8) between user nodes 802 corresponding to the user and concept nodes 804 corresponding to the song and application to indicate that the user listened to the song and used the application. Moreover, the social-networking system 160 may create a "played" edge 806 (as illustrated in FIG. 8) between concept nodes 804 corresponding to the song and the application to indicate that the particular song was played by the particular application. In this case, "played" edge 806 corresponds to an action performed by an external application (the third-party online music application) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "online music application").

In particular embodiments, the social-networking system 160 may create an edge 806 between a user node 802 and a concept node 804 in the social graph 800. As an example and not by way of limitation, a user viewing a concept-profile interface (such as, for example, by using a web browser or a special-purpose application hosted by the user's client system 130) may indicate that he or she likes the concept represented by the concept node 804 by clicking or selecting a "Like" icon, which may cause the user's client system 130 to send to the social-networking system 160 a message indicating the user's liking of the concept associated with the concept-profile interface. In response to the message, the social-networking system 160 may create an edge 806 between user node 802 associated with the user and concept node 804, as illustrated by "like" edge 806 between the user and concept node 804. In particular embodiments, the social-networking system 160 may store an edge 806 in one or more data stores. In particular embodiments, an edge 806 may be automatically formed by the social-networking system 160 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

Vector Spaces and Embeddings

Figure 9:
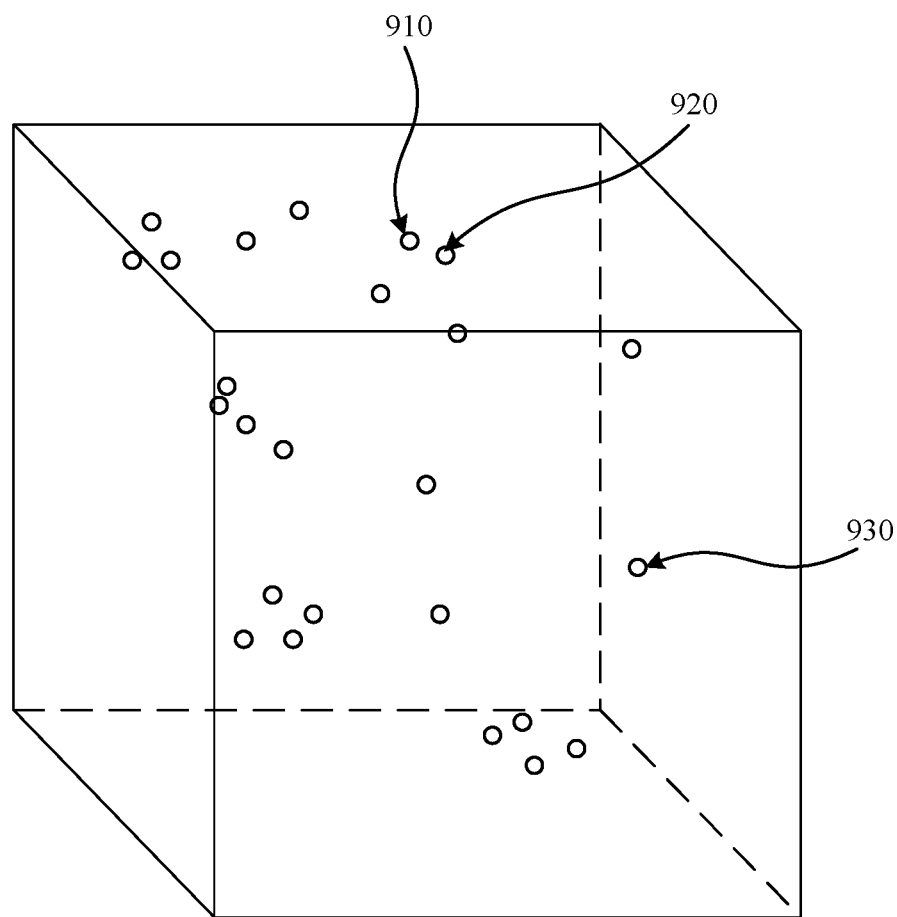
FIG. 9 illustrates an example view of an embedding space.

FIG. 9 illustrates an example view of a vector space 900. In particular embodiments, an object or an n-gram may be represented in a d-dimensional vector space, where d denotes any suitable number of dimensions. Although the vector space 900 is illustrated as a three-dimensional space, this is for illustrative purposes only, as the vector space 900 may be of any suitable dimension. In particular embodiments, an n-gram may be represented in the vector space 900 as a vector referred to as a term embedding. Each vector may comprise coordinates corresponding to a particular point in the vector space 900 (i.e., the terminal point of the vector). As an example and not by way of limitation, vectors 910, 920, and 930 may be represented as points in the vector space 900, as illustrated in FIG. 9. An n-gram may be mapped to a respective vector representation. As an example and not by way of limitation, n-grams $t_1$ and $t_2$ may be mapped to vectors $\vec{v}_1$ and $\vec{v}_2$ in the vector space 900, respectively, by applying a function $\vec{\pi}$ defined by a dictionary, such that $\vec{v}_1 = \vec{\pi}(t_1)$ and $\vec{v}_2 = \vec{\pi}(t_2)$. As another example and not by way of limitation, a dictionary trained to map text to a vector representation may be utilized, or such a dictionary may be itself generated via training. As another example and not by way of limitation, a word-embeddings model may be used to map an n-gram to a vector representation in the vector space 900. In particular embodiments, an n-gram may be mapped to a vector representation in the vector space 900 by using a machine leaning model (e.g., a neural network). The machine learning model may have been trained using a sequence of training data (e.g., a corpus of objects each comprising n-grams).

In particular embodiments, an object may be represented in the vector space 900 as a vector referred to as a feature vector or an object embedding. As an example and not by way of limitation, objects $e_1$ and $e_2$ may be mapped to vectors $\vec{v}_1$ and $\vec{v}_2$ in the vector space 900, respectively, by applying a function $\vec{\pi}$, such that $\vec{v}_1 = \vec{\pi}(e_1)$ and $\vec{v}_2 = \vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 900. A similarity metric may be a cosine similarity, a Minkowski distance, a Mahalanobis distance, a Jaccard similarity coefficient, or any suitable similarity metric. As an example and not by way of limitation, a similarity metric of $\vec{v}_1$ and $\vec{v}_2$ may be a cosine similarity $$\frac{\vec{v}_1 \cdot \vec{v}_2}{\|\vec{v}_1\| \|\vec{v}_2\|}.$$

As another example and not by way of limitation, a similarity metric of $\vec{v}_1$ and $\vec{v}_2$ may be a Euclidean distance $\|\vec{v}_1 - \vec{v}_2\|$. A similarity metric of two vectors may represent how similar the two objects or n-grams corresponding to the two vectors, respectively, are to one another, as measured by the distance between the two vectors in the vector space 900. As an example and not by way of limitation, vector 910 and vector 920 may correspond to objects that are more similar to one another than the objects corresponding to vector 910 and vector 930, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 10:
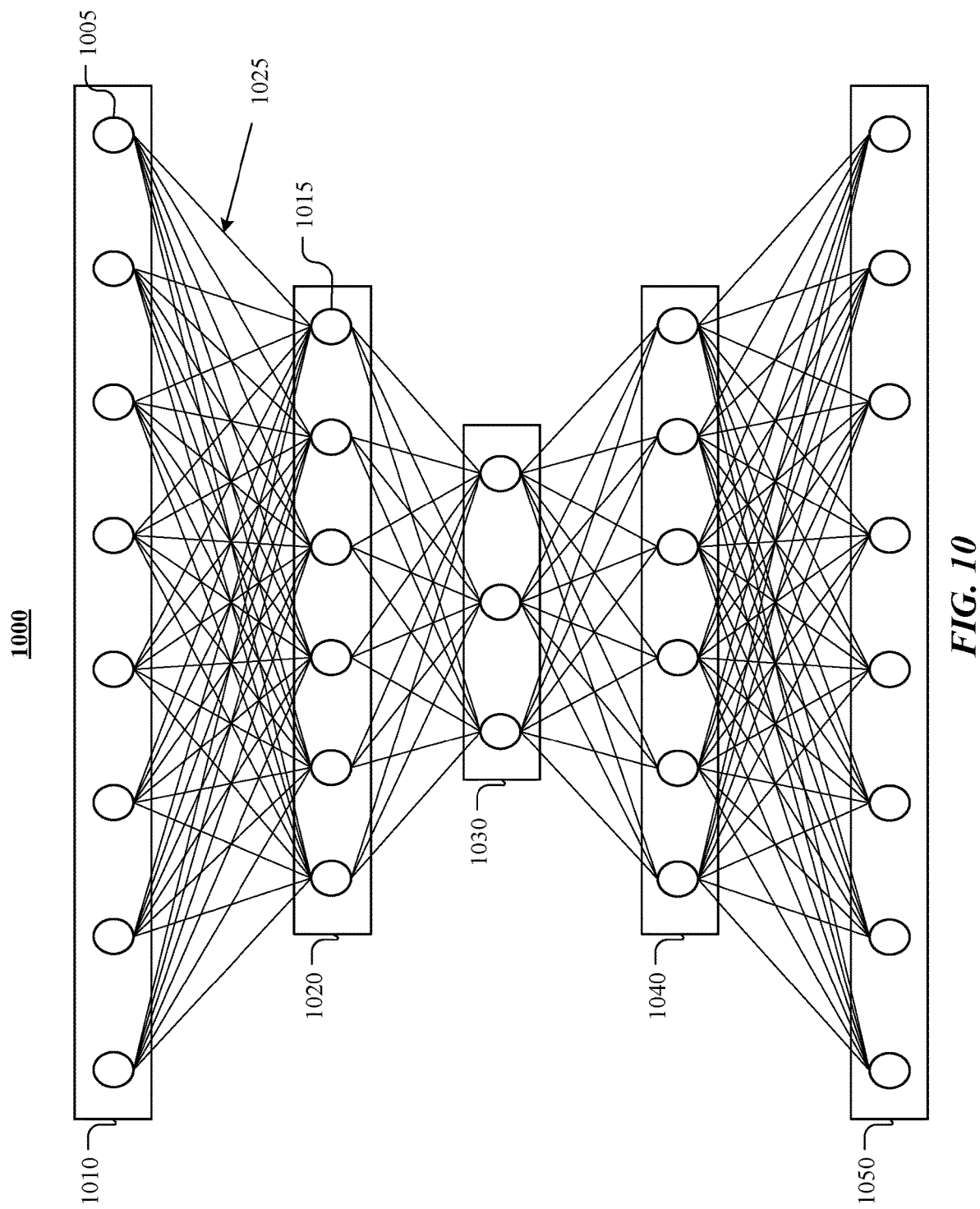
FIG. 10 illustrates an example artificial neural network.

FIG. 10 illustrates an example artificial neural network ("ANN") 1000. In particular embodiments, an ANN may refer to a computational model comprising one or more nodes. Example ANN 1000 may comprise an input layer 1010, hidden layers 1020, 1030, 1040, and an output layer 1050. Each layer of the ANN 1000 may comprise one or more nodes, such as a node 1005 or a node 1015. In particular embodiments, each node of an ANN may be connected to another node of the ANN. As an example and not by way of limitation, each node of the input layer 1010 may be connected to one of more nodes of the hidden layer 1020. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 10 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 10 depicts a connection between each node of the input layer 1010 and each node of the hidden layer 1020, one or more nodes of the input layer 1010 may not be connected to one or more nodes of the hidden layer 1020.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1020 may comprise the output of one or more nodes of the input layer 1010. As another example and not by way of limitation, the input to each node of the output layer 1050 may comprise the output of one or more nodes of the hidden layer 1040. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1025 between the node 1005 and the node 1015 may have a weighting coefficient of 0.4, which may indicate that 0.4 multiplied by the output of the node 1005 is used as an input to the node 1015. As another example and not by way of limitation, the output $y_k$ of node k may be $y_k=F_k(S_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1000 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 804 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 800. A privacy setting may be specified for one or more edges 806 or edge-types of the social graph 800, or with respect to one or more nodes 802, 804 or node-types of the social graph 800. The privacy settings applied to a particular edge 806 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 804 connected to a user node 802 of the first user by an edge 806. The first user may specify privacy settings that apply to a particular edge 806 connecting to the concept node 804 of the object, or may specify privacy settings that apply to all edges 806 connecting to the concept node 804. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client device 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such image may be used only for a limited purpose (e.g., authentication, tagging the user in photos), and further specify that such image may not be shared with any third-party system 170 or used by other processes or applications associated with the social-networking system 160.

Systems and Methods

Figure 11:
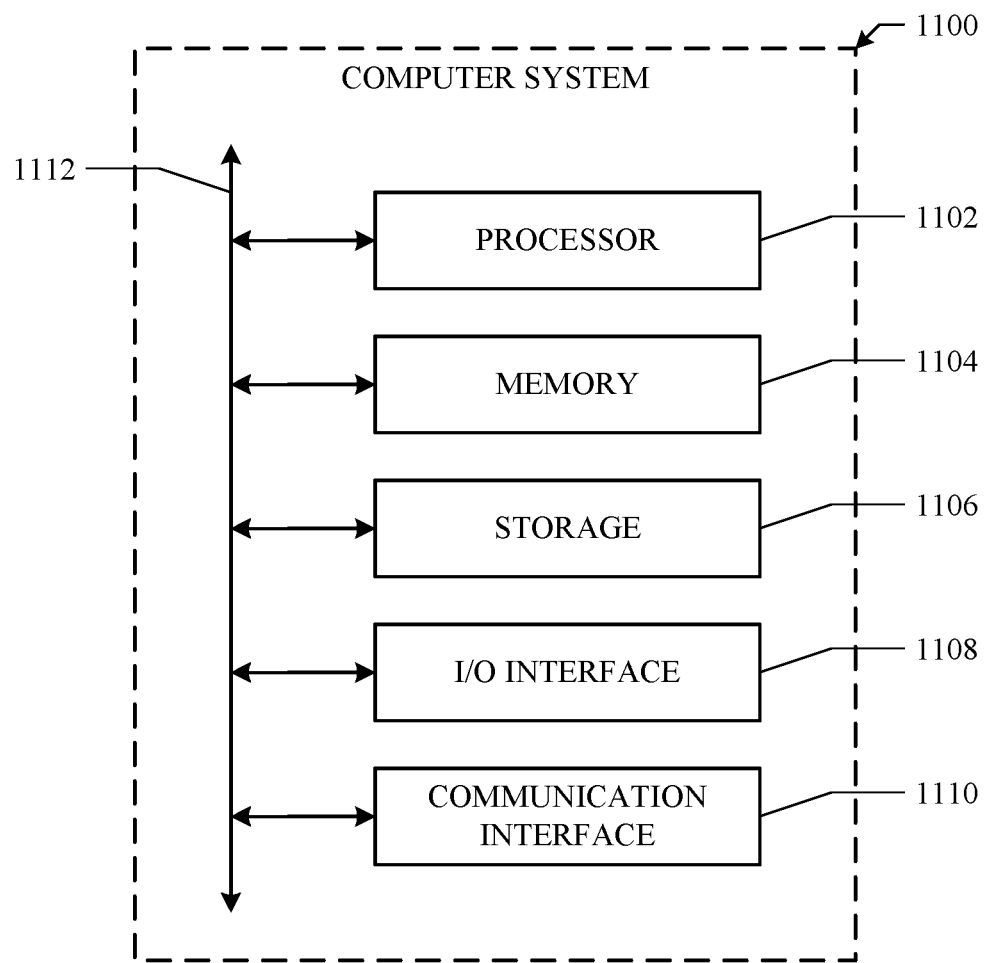
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
    receiving, from a client system associated with a user, a query from the user;
    accessing a knowledge graph comprising a plurality of nodes and a plurality of edges connecting the nodes, wherein each node corresponds to an entity, and wherein each edge corresponds to a relationship between the entities corresponding to the connected nodes;
    determining, based on the query, one or more initial entities associated with the query;
    determining, by a conversational reasoning model, a path connecting nodes corresponding to the one or more initial entities and nodes corresponding to candidate entities based on one or more entity paths and one or more relation paths, wherein the one or more entity paths are determined based on optimizing a loss function formulated based on a context vector associated with the query and context vectors associated with the candidate entities, and wherein the one or more relation paths are determined based on relationships between the one or more initial entities and the candidate entities;
    selecting, based on the path by the conversational reasoning model, one or more candidate nodes from the knowledge graph corresponding to one or more candidate entities, respectively;
    generating a response based on the one or more initial entities and the one or more candidate entities; and
    sending, to the client system in response to the query, instructions for presenting the response.

2. The method of claim 1, wherein the conversational reasoning model is based on one or more machine-learning models.

3. The method of claim 2, wherein the one or more machine-learning models comprise at least a long-short term memory (LSTM) model.

4. The method of claim 1, further comprising:
    determining a relevance between the one or more initial entities and each of the plurality of nodes in the knowledge graph, wherein selecting the one or more candidate nodes is further based on the determined relevance of the respective candidate nodes.

5. The method of claim 1, wherein determining the path comprises:
    generating an entity representation for the one or more initial entities associated with the query;
    generating a sentence representation for a context associated with the query;
    generating a dialog representation for one or more dialog states associated with the query; and
    generating an aggregated input based on the entity representation, the sentence representation, and the dialog representation.

6. The method of claim 5, wherein generating the entity representation is based on a neural network model.

7. The method of claim 5, wherein generating the sentence representation is based on a long-short term memory (LSTM) model.

8. The method of claim 5, wherein generating the dialog representation is based on a long-short term memory (LSTM) model.

9. The method of claim 5, wherein the query is associated with a particular task, wherein each of the entity representation, sentence representation, and dialog representation has a respective importance level with respect to the particular task, and wherein generating the aggregated input is further based on the respective importance level of the entity representation, sentence representation, and dialog representation with respect to the particular task.

10. The method of claim 5, wherein determining the path further comprises:
    inputting the aggregated input to the conversational reasoning model, and wherein the conversational reasoning model generates one or more candidate paths attending to a plurality of nodes within the knowledge graph.

11. The method of claim 10, further comprising:
    determining, for each of the one or more candidate paths, a relevance with respect to the one or more initial entities; and
    ranking the one or more candidate paths based on their respective relevance with respect to the one or more initial entities.

12. The method of claim 11, further comprising:
selecting the top ranked path as the determined path.

13. The method of claim 1, wherein generating the response is further based on one or more language templates.

14. One or more computer-readable non-transitory storage media embodying software that is operable when executed to:
receive, from a client system associated with a user, a query from the user;
access a knowledge graph comprising a plurality of nodes and a plurality of edges connecting the nodes, wherein each node corresponds to an entity, and wherein each edge corresponds to a relationship between the entities corresponding to the connected nodes;
determine, based on the query, one or more initial entities associated with the query;
determine, by a conversational reasoning model, a path connecting nodes corresponding to the one or more initial entities and nodes corresponding to candidate entities based on one or more entity paths and one or more relation paths, wherein the one or more entity paths are determined based on optimizing a loss function formulated based on a context vector associated with the query and context vectors associated with the candidate entities, and wherein the one or more relation paths are determined based on relationships between the one or more initial entities and the candidate entities;
select, based on the path by the conversational reasoning model, one or more candidate nodes from the knowledge graph corresponding to one or more candidate entities, respectively;
generate a response based on the one or more initial entities and the one or more candidate entities; and
send, to the client system in response to the query, instructions for presenting the response.

15. The media of claim 14, wherein the software is further operable when executed to:
determine a relevance between the one or more initial entities and each of the plurality of nodes in the knowledge graph, wherein selecting the one or more candidate nodes is further based on the determined relevance of the respective candidate nodes.

16. The media of claim 14, wherein determining the path comprises:
generating an entity representation for the one or more initial entities associated with the query;
generating a sentence representation for a context associated with the query;
generating a dialog representation for one or more dialog states associated with the query; and
generating an aggregated input based on the entity representation, the sentence representation, and the dialog representation.

17. The media of claim 16, wherein determining the path further comprises:
inputting the aggregated input to the conversational reasoning model, and wherein the conversational reasoning model generates one or more candidate paths attending to a plurality of nodes within the knowledge graph.

18. The media of claim 17, wherein the software is further operable when executed to:
determine, for each of the one or more candidate paths, a relevance with respect to the one or more initial entities; and
rank the one or more candidate paths based on their respective relevance with respect to the one or more initial entities.

19. The media of claim 18, wherein the software is further operable when executed to:
select the top ranked path as the determined path.

20. A system comprising: one or more processors; and a non-transitory memory coupled to the processors comprising instructions executable by the processors, the processors operable when executing the instructions to:
receive, from a client system associated with a user, a query from the user;
access a knowledge graph comprising a plurality of nodes and a plurality of edges connecting the nodes, wherein each node corresponds to an entity, and wherein each edge corresponds to a relationship between the entities corresponding to the connected nodes;
determine, based on the query, one or more initial entities associated with the query;
determine, by a conversational reasoning model, a path connecting nodes corresponding to the one or more initial entities and nodes corresponding to candidate entities based on one or more entity paths and one or more relation paths, wherein the one or more entity paths are determined based on optimizing a loss function formulated based on a context vector associated with the query and context vectors associated with the candidate entities, and wherein the one or more relation paths are determined based on relationships between the one or more initial entities and the candidate entities;
select, based on the path by the conversational reasoning model, one or more candidate nodes from the knowledge graph corresponding to one or more candidate entities, respectively;
generate a response based on the one or more initial entities and the one or more candidate entities; and
send, to the client system in response to the query, instructions for presenting the response.

* * * * *